(12) United States Patent
Rusanovskyy et al.

(10) Patent No.: US 11,533,512 B2
(45) Date of Patent: Dec. 20, 2022

(54) DYNAMIC RANGE ADJUSTMENT PARAMETER SIGNALING AND ENABLEMENT OF VARIABLE BIT DEPTH SUPPORT

(71) Applicant: QUALCOMM Incorporated, San Diego, CA (US)

(72) Inventors: Dmytro Rusanovskyy, San Diego, CA (US); Adarsh Krishnan Ramasubramanian, Irvine, CA (US); Yan Zhang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/225,801

(22) Filed: Apr. 8, 2021

(65) Prior Publication Data

US 2021/0329304 A1    Oct. 21, 2021

Related U.S. Application Data

(60) Provisional application No. 63/008,533, filed on Apr. 10, 2020.

(51) Int. Cl.
*H04N 19/70* (2014.01)
*H04N 19/172* (2014.01)
*H04N 19/169* (2014.01)

(52) U.S. Cl.
CPC .......... *H04N 19/70* (2014.11); *H04N 19/172* (2014.11); *H04N 19/188* (2014.11)

(58) Field of Classification Search
CPC ...... H04N 19/85; H04N 19/70; H04N 19/172; H04N 19/188
See application file for complete search history.

(56) References Cited

U.S. PATENT DOCUMENTS

2013/0114694 A1\* 5/2013 Chen ............... H04N 19/70
                                              375/240.03
2017/0085894 A1\* 3/2017 Ramasubramanian ...................
                                              H04N 19/85

(Continued)

FOREIGN PATENT DOCUMENTS

EP    2938084 A1    10/2015
JP    2005341184 A  * 12/2005
WO   2017011636 A1    1/2017

OTHER PUBLICATIONS

Choi, K., et al. "Textof ISO/IEC CD 23094-1, Essential Video Coding." Coding of Moving Pictures and Audio,(Motion Picture Expert Group or ISO/IEC JTC1/SC29/WG11) 18568 (2019). (Year: 2019).*

(Continued)

*Primary Examiner* — Maria E Vazquez Colon
(74) *Attorney, Agent, or Firm* — Shumaker & Sieffert, P.A.

(57) ABSTRACT

An example device for processing video data includes memory configured to store the video data and one or more processors implemented in circuitry and coupled to the memory. The one or more processors are configured to parse a first parameter set, the first parameter set being signaled in a bitstream data once per sequence of a group of encoded pictures. The one or more processors are configured to parse one or more dynamic range adjustment (DRA) syntax elements in a second parameter set, the second parameter set being signaled in the bitstream and being related to at least one picture in the group of encoded pictures, wherein the parsing of the one or more DRA syntax elements is not dependent on any syntax element of the first parameter set, and process the at least one picture based on the first parameter set and the second parameter set.

23 Claims, 16 Drawing Sheets

(56) References Cited

U.S. PATENT DOCUMENTS

2019/0045209 A1* 2/2019 Ramasubramonian ............... H04N 19/80
2021/0211674 A1* 7/2021 Lim ...................... H04L 65/764

OTHER PUBLICATIONS

Allan et al. "Draft Text of ISO.IEC DIS 23094-2, Low Complexity Enhancement Video Coding." Coding of Moving Pictures and Audio,(Motion Picture Expert Group or ISO/IEC JTC1/SC29/WG11) 18986 (Mar. 2020). (Year: 2020).*

Bross B., et al., "Versatile Video Coding (Draft 8)", Joint Video Experts Team (JVET) of ITU-T SG 16 WP 3 and ISO/IEC JTC 1/SC 29/WG 11,17th Meeting: Brussels, BE, Jan. 7, 2020-Jan. 17, 2020, Document: JVET-Q2001-vE, No. JVET-Q2001, m52905, Jan. 22, 2020 (Jan. 22, 2020), XP030285390, 515 pages, Retrieved from the Internet: URL: http://phenix.int-evry.fr/jvet/doc_end_user/documents/17_Brussels/wg11/JVET-Q2001-v15.zip JVET-Q2001-vE.docx [retrieved on Mar. 12, 2020].

Choi K., et al., "[EVC] Editorial Input on EVC Draft Text", Coding of Moving Pictures and Audio, ISO/IEC JTC1/SC29/WG11 MPEG2020/M53736, Apr. 18, 2020, M53736-V3. Alpbach, AU, 1 page.

International Search Report and Written Opinion—PCT/US2021/026561—ISA/EPO—dated Jun. 30, 2021.

ITU-R Recommendation BT.2020-2: "Parameter Values for Ultra-High Definition Television Systems for Production and International Programme Exchange", ITU-R BT.2020-2, Oct. 2015, 8 Pages.

ITU-R Recommendation BT.709-6, "Parameter Values for the HDTV Standards for Production and International Programme Exchange", ITU-R BT.709-6, Jun. 2015, 19 Pages.

ITU-T H.265: "Series H: Audiovisual and Multimedia Systems Infrastructure of Audiovisual Services—Coding of Moving Video High Efficiency Video Coding", The International Telecommunication Union, Jun. 2019, 696 Pages.

"SMPTE Standard for Motion-Picture Film (8-mm TypeR)—Camera Aperture Image and Usage", SMPTE 231-2004, Society of Motion Picture & Television Engineers, Nov. 8, 2004, 4 pages.

Qualcomm Inc: "Dynamic Range Adjustment SEI to Enable High Dynamic Range Video Coding with Backward-Compatible Capability", ITU-T SG16 Meeting, Oct. 12, 2015-Oct. 23, 2015, Geneva, No. COM 16-C 1027-E, ITU-T, Sep. 29, 2015, XP030100746, pp. 1-11.

Ramasubramonian A.K., et al., "HDR CE2.a-1: Report on LCS", JCTVC-W0101, Joint Collaborative Team on Video Coding (JCT-VC) of ITU-T SG 16 WP 3 and ISO/IEC JTC 1/SC 29/WG 11, 23rd Meeting: San Diego, USA, Feb. 19-26, 2016, pp. 1-2.

Rusanovskyy (Qualcomm) D., et al., "[EVC] On HDR Support in EVC", International Organisation for Standardisation Organisation Internationale De Normalisation ISO/IEC JTC1/SC29/WG11 Coding of Moving Pictures and Audio ISO/IEC JTC1/SC29/WG11 MPEG2016/m52291, HDR r2, Oct. 2019, Geneva, Switzerland, 6 Pages.

Rusanovskyy (Qualcomm) D., et al., "[EVC] On HDR/WCG Support in EVC", 129. MPEG Meeting, Jan. 13, 2020-Jan. 17, 2020, Brussels, (Motion Picture Expert Group or ISO/IEC JTC1/SC29/WG11), No. m52291, m52290, Jan. 12, 2020 (Jan. 12, 2020), XP030224896, Retrieved from the Internet: URL:http://phenix.int-evry.fr/mpeg/doc_end_user/documents/129_Brussels/wg11/m52291-v3-m52291_hdr_r2.zip m52291_hdr_r2.docx [retrieved on Jan. 12, 2020].

Rusanovskyy (Qualcomm) D., et al., "[EVC] Suggested Improvements for EVC Specification and Test Model", 129. MPEG Meeting, Jan. 13, 2020-Jan. 17, 2020, Brussels, (Motion Picture Expert Group or ISO/IEC JTC1/SC29/WG11), no. m52290, Jan. 16, 2020 (Jan. 16, 2020), XP030224893, Jan. 2019, 4 Pages, Retrieved from the Internet: URL: http://phenix.int-evry.fr/mpeg/doc_end_user/documents/129_Brussels/wg11/m52290-v4-m52291_hdr_r5.zipm52291_draftText_EVC_Study_Text_FDIS_23094-1 r2.docx [retrieved on Jan. 16, 2020].

SMPTE Standard, "High Dynamic Range Electro-Optical Transfer Function of Mastering Reference Displays", SMPTE ST 2084:2014, The Society of Motion Picture and Television Engineers, Aug. 16, 2014, XP055225088, pp.1-14, ISBN: 978-1-61482-829-7.

'Hang (Qualcomm) Y., et al., "[EVC] Suggested Improvements for EVC Specification and Test Model", International Organisation for Standardisation Organisation Internationale De Normalisation Iso/Iec JTC1/SC29/WG11 Coding of Moving Pictures and Audio Iso/Iec JTC1/SC29/WG11 MPEG2016/m53608 Apr. 19, 2020, Alpbach, Austria, 8 Pages.

* cited by examiner

Example of EOTFs

TABLE 8-10 – SPECIFICATION OF Qpc AS A FUNCTION OF qPi FOR CHROMAARRAYTYPE EQUAL TO 1

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| Qpc | = qPi | 29 | 30 | 31 | 32 | 33 | 33 | 34 | 34 | 35 | 35 | 36 | 36 | 37 | 37 | = qPi − 6 |

FIG. 11

DYNAMIC RANGE ADJUSTMENT PARAMETER SIGNALING AND ENABLEMENT OF VARIABLE BIT DEPTH SUPPORT

This application claims the benefit of U.S. Provisional Patent Application 63/008,533, filed Apr. 10, 2020, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for signaling and operations applied to video data to enable more efficient compression of some types of video data, such as high dynamic range (HDR) and wide color gamut (WCG) video data. More specifically this disclosure describes techniques for implementation of a Dynamic Range Adjustment coding tool and the removal of parsing dependencies and enabling support for video data with different bit depths. By removing parsing dependencies, the techniques of this disclosure may enable independent parsing of different parameter sets, thereby improving decoding latency.

In one example, a method includes parsing a first parameter set, the first parameter set being signaled in a bitstream of encoded video data once per sequence of a group of encoded pictures, parsing one or more dynamic range adjustment (DRA) syntax elements in a second parameter set, the second parameter set being signaled in the bitstream of encoded video data and being related to at least one picture in the group of encoded pictures, wherein the parsing of the one or more DRA syntax elements is not dependent on any syntax element of the first parameter set, and processing the at least one picture based on the first parameter set and the second parameter set.

In another example, a device for processing video data includes memory configured to store the video data and one or more processors implemented in circuitry and coupled to the memory, the one or more processors being configured to: parse a first parameter set, the first parameter set being signaled in a bitstream of encoded video data once per sequence of a group of encoded pictures; parse one or more dynamic range adjustment (DRA) syntax elements in a second parameter set, the second parameter set being signaled in the bitstream of encoded video data and being related to at least one picture in the group of encoded pictures, wherein the parsing of the one or more DRA syntax elements is not dependent on any syntax element of the first parameter set; and process the at least one picture based on the first parameter set and the second parameter set.

In another example, a non-transitory computer-readable storage medium is encoded with instructions that, when executed, cause one or more processors to parse a first parameter set, the first parameter set being signaled in a bitstream of encoded video data once per sequence of a group of encoded pictures, parse one or more dynamic range adjustment (DRA) syntax elements in a second parameter set, the second parameter set being signaled in the bitstream of encoded video data and being related to at least one picture in the group of encoded pictures, wherein the parsing of the one or more DRA syntax elements is not dependent on any syntax element of the first parameter set, and process the at least one picture based on the first parameter set and the second parameter set.

In another example, a device for processing video data includes means for parsing a first parameter set, the first parameter set being signaled in a bitstream of encoded video data once per sequence of a group of encoded pictures, means for parsing one or more dynamic range adjustment (DRA) syntax elements in a second parameter set, the second parameter set being signaled in the bitstream of encoded video data and being related to at least one picture in the group of encoded pictures, wherein the parsing of the one or more DRA syntax elements is not dependent on any syntax element of the first parameter set, and means for processing the at least one picture based on the first parameter set and the second parameter set.

The details of one or more examples are set forth in the accompanying drawings and the description below. Other features, objects, and advantages will be apparent from the description, drawings, and claims.

BRIEF DESCRIPTION OF DRAWINGS

FIG. 11 is a conceptual diagram illustrating an example table specifying Qpc as a function of qPi.

DETAILED DESCRIPTION

In some draft video coding standards, there may be parsing dependencies between one parameter set and another parameter set. For example, parsing of syntax elements in a picture parameter set (PPS) or an adaptation parameter set (APS) may be dependent on a syntax element(s) in a sequence parameter set (SPS). Such dependencies may be undesirable, as parameter sets are typically in different network abstraction layer (NAL) units and may arrive at a video decoder at different times. With such dependencies, if a PPS or APS applicable to a particular block of video data arrives at the video decoder prior to the SPS that is applicable to that particular block, the video decoder may have to wait until the SPS arrives and parse that SPS prior to parsing the PPS or the APS. This may lead to decoding latencies while the video decoder is waiting for the SPS to arrive.

According to the techniques of this disclosure, the dependencies may be removed from between DRA syntax elements of the PPS and/or DRA syntax elements of the APS, and the SPS. A video decoder may receive the PPS and/or the APS prior to receiving the SPS and may parse the PPS and/or APS without waiting for the SPS, as the DRA syntax elements of the PPS and/or the DRA syntax elements of the APS may not be dependent on any syntax element within the SPS. In this manner, decoding latency may be reduced compared to cases where one parameter set is dependent on a syntax element in another parameter set.

Figure 1:
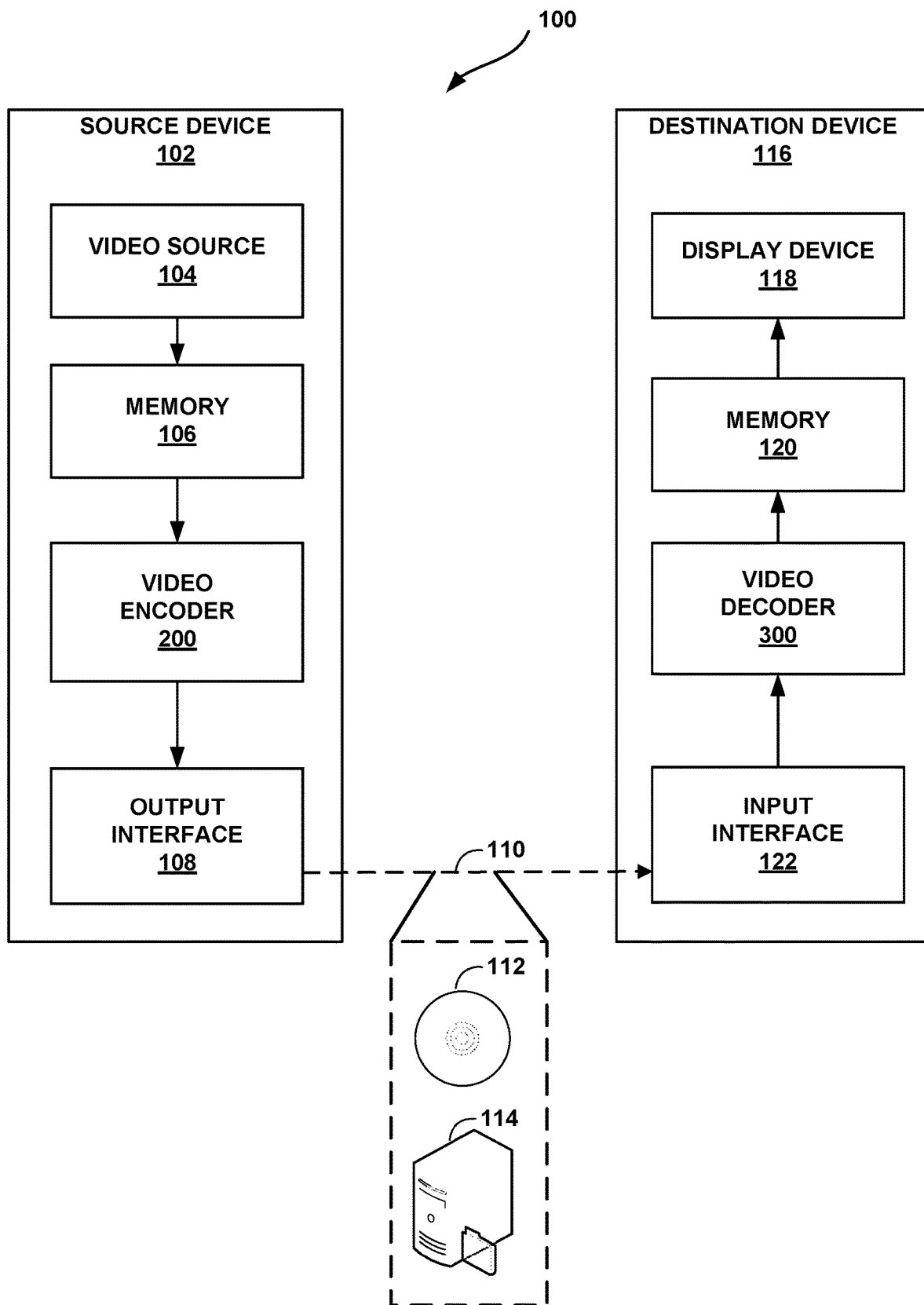
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for implementation of a Dynamic Range Adjustment coding tool and the removal of parsing dependency and enabling support for video data with different bit depths. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for implementation of a Dynamic Range Adjustment coding tool and the removal of parsing dependency and enabling support for video data with different bit depths. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may demodulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A recent draft of the VVC standard is described in Bross, et al. "Versatile Video Coding (Draft 8)," Joint Video Experts Team (WET) of ITU-T SG 16 WP 3 and ISO/IEC JTC 1/SC 29/WG 11, 17$^{th}$ Meeting: Brussels, BE, 7-17 Jan. 2020, WET-Q2001-vE (hereinafter "VVC Draft 8"). Alternatively, video encoder 200 may operate according to MPEG-5 Enhanced Video Coding (EVC). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC and EVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. Examples of EVC may provide other intra-prediction modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), video parameter set (VPS), or adaptation parameter set (APS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

As will be explained in more detail below, this disclosure describes techniques for parsing syntax elements. In some examples, this disclosure describes techniques for parsing syntax elements related to DRA where certain dependencies between syntax elements in different parameter sets are removed. In one example, a method includes parsing an SPS applicable to a block of video data, parsing one or more DRA syntax elements in a second parameter set applicable to the block, wherein the parsing of the one or more DRA syntax elements is not dependent on any syntax element of the SPS, and processing the block based on the SPS and second parameter set.

In accordance with the techniques of this disclosure, a method includes parsing a first parameter set, the first parameter set being signaled in a bitstream of encoded video data once per sequence of a group of encoded pictures, parsing one or more dynamic range adjustment (DRA) syntax elements in a second parameter set, the second parameter set being signaled in the bitstream of encoded video data and being related to at least one picture in the group of encoded pictures, wherein the parsing of the one or more DRA syntax elements is not dependent on any syntax element of the first parameter set, and processing the at least one picture based on the first parameter set and the second parameter set.

In accordance with the techniques of this disclosure, a device includes memory configured to store video data and one or more processors implemented in circuitry and coupled to the memory, the one or more processors being configured to: parse a first parameter set, the first parameter set being signaled in a bitstream of encoded video data once per sequence of a group of encoded pictures; parse one or more dynamic range adjustment (DRA) syntax elements in a second parameter set, the second parameter set being signaled in the bitstream of encoded video data and being related to at least one picture in the group of encoded pictures, wherein the parsing of the one or more DRA syntax elements is not dependent on any syntax element of the first parameter set; and process the at least one picture based on the first parameter set and the second parameter set.

In accordance with the techniques of this disclosure, a device includes means for parsing a first parameter set, the first parameter set being signaled in a bitstream of encoded video data once per sequence of a group of encoded pictures, means for parsing one or more dynamic range adjustment (DRA) syntax elements in a second parameter set, the second parameter set being signaled in the bitstream of encoded video data and being related to at least one picture in the group of encoded pictures, wherein the parsing of the one or more DRA syntax elements is not dependent on any syntax element of the first parameter set, and means for processing the at least one picture based on the first parameter set and the second parameter set.

In accordance with the techniques of this disclosure, a non-transitory computer-readable storage medium is encoded with instructions that, when executed, cause one or more processors to parse a first parameter set, the first parameter set being signaled in a bitstream of encoded video data once per sequence of a group of encoded pictures, parse one or more dynamic range adjustment (DRA) syntax elements in a second parameter set, the second parameter set being signaled in the bitstream of encoded video data and being related to at least one picture in the group of encoded pictures, wherein the parsing of the one or more DRA syntax elements is not dependent on any syntax element of the first parameter set, and process the at least one picture based on the first parameter set and the second parameter set.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2:
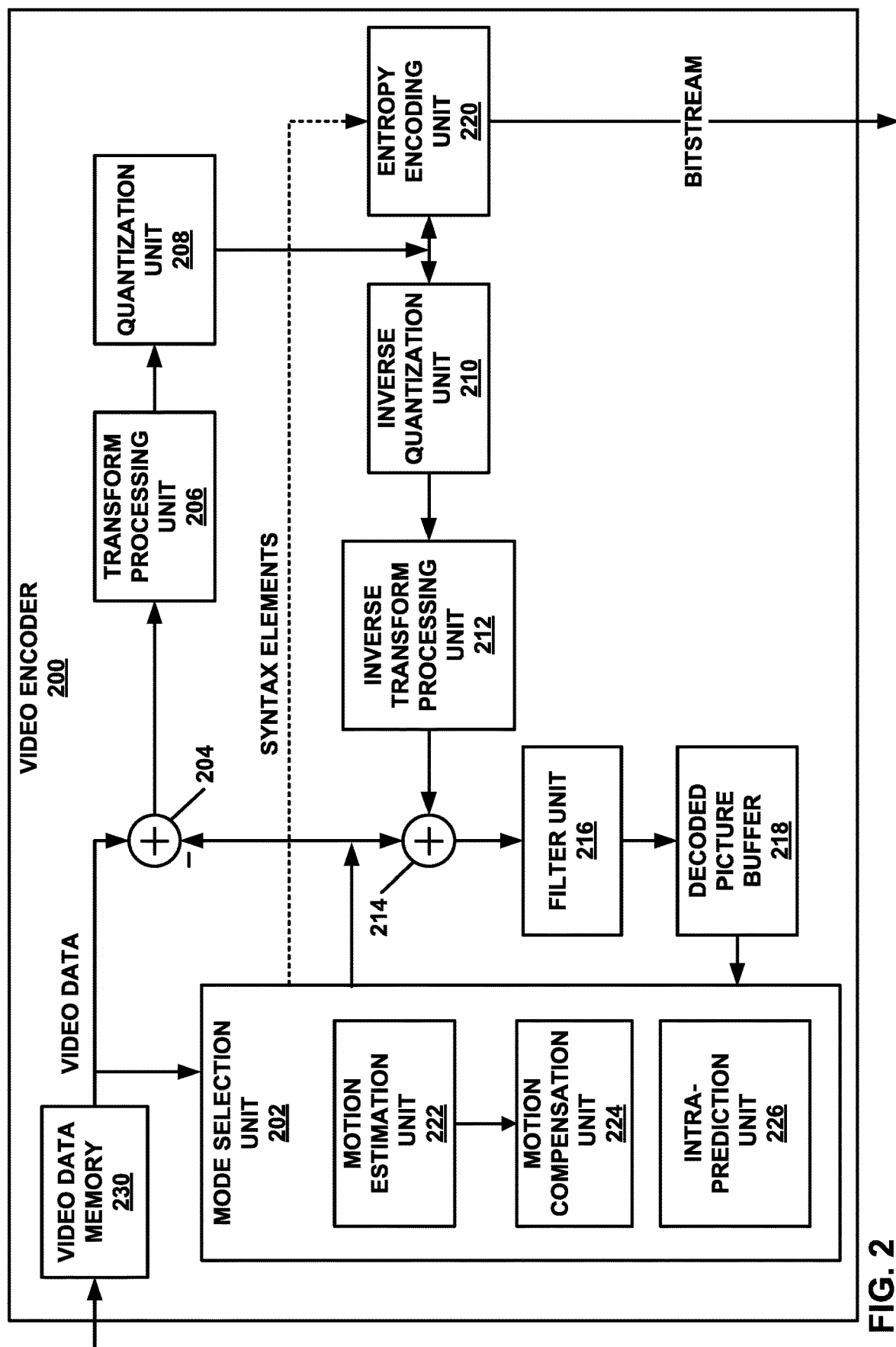
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of VVC (ITU-T H.266, under development), HEVC (ITU-T H.265), and EVC. However, the techniques of this disclosure may be performed by video encoding devices that are configured to other video coding standards.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions. In some examples, video encoder 200 may also include a forward DRA unit which may perform DRA signaling techniques of this disclosure and which will be described with respect to FIG. 13 later herein.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded. In some examples, entropy encoding unit 220 may encode an SPS, PPS, and/or an APS, where the parameter sets are independent from each other, such that no syntax elements of the SPS need to be parsed by a video decoder prior to parsing the PPS and/or the APS.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to signal a first parameter set applicable in a bitstream of encoded video data once per sequence of a group of encoded pictures, determine one or more DRA syntax elements in a second parameter set applicable to at least one picture of the group of encoded pictures, and signal the second parameter set in the bitstream of encoded video, wherein parsing of the one or more DRA syntax elements by a video decoder is not dependent on any syntax element of the SPS.

Figure 3:
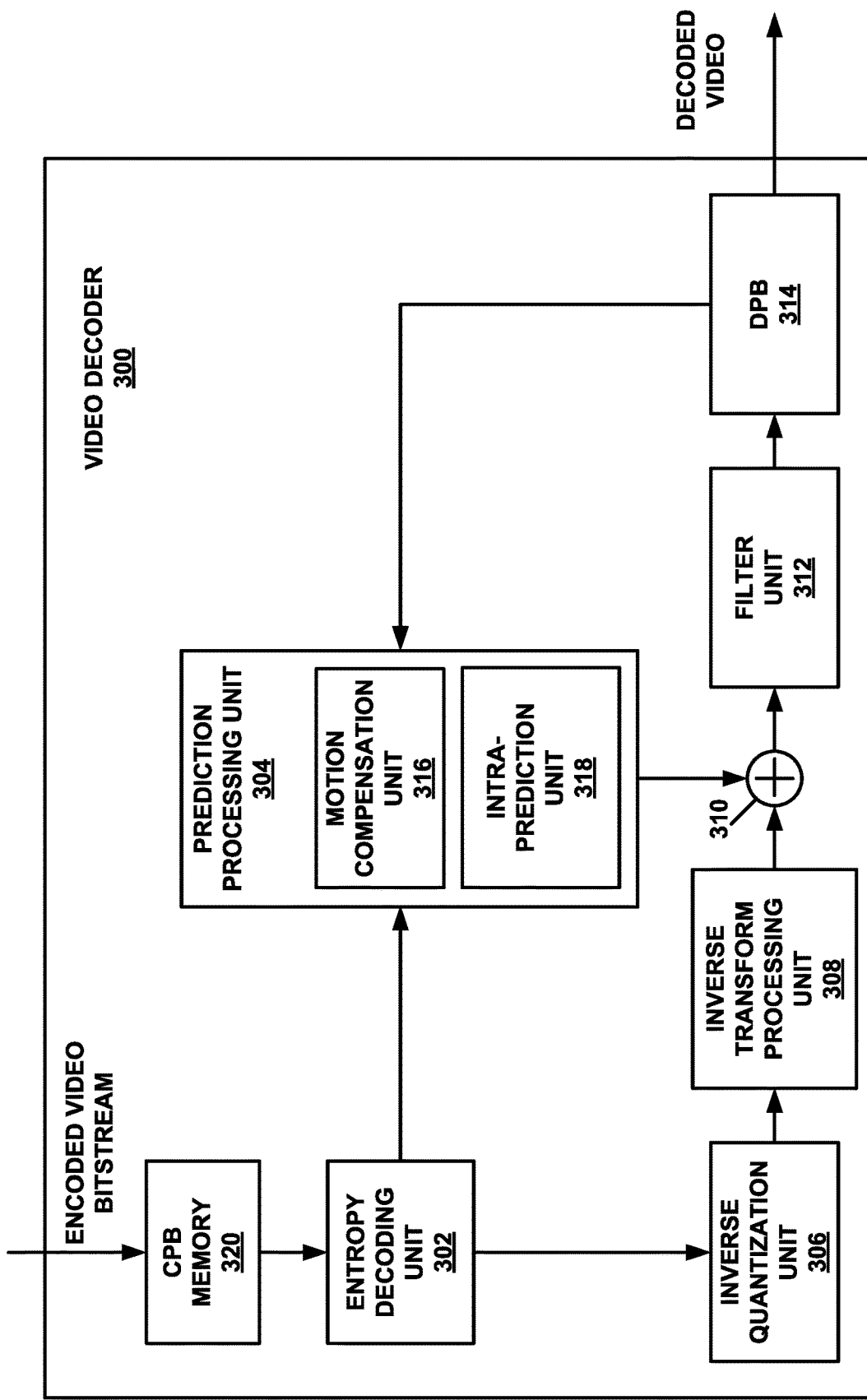
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC (ITU-T H.266, under development), HEVC (ITU-T H.265), and EVC. However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions. In some examples, video decoder 300 may also include an output DRA unit which may perform the DRA parsing techniques of this disclosure and which will be described with respect to FIG. 13 later herein.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). In some examples, entropy decoding unit 302 may decode an SPS, a PPS, and/or an APS, where the parameter sets are independent from each other, such that video decoder 300 does not need to parse any syntax elements of the SPS prior to parsing the PPS and/or the APS. For example, video decoder 300 may parse an SPS applicable to a block of video data. Video decoder 300 may independently parse a second parameter set (e.g., a PPS or an APS) applicable to the block, wherein the parsing of the second parameter set is not dependent on any syntax element of the SPS. Video decoder 300 may process the block based on the SPS and second parameter set. Parsing a syntax element or a parameter set may mean analyzing a bit or string of bits to determine value(s) of the bit or sting of bits.

Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store the video data, and one or more processors implemented in circuitry and coupled to the memory, the one or more processors being configured to: parse a first parameter set, the first parameter set being signaled in a bitstream of encoded video data once per sequence of a group of encoded pictures; parse one or more dynamic range adjustment (DRA) syntax elements in a second parameter set, the second parameter set being signaled in the bitstream of encoded video data and being related to at least one picture in the group of encoded pictures, wherein the parsing of the one or more DRA syntax elements is not dependent on any syntax element of the first parameter set; and process the at least one picture based on the first parameter set and the second parameter set.

Next generation video applications may operate with video data representing captured scenery with high dynamic range (HDR) and wide color gamut (WCG). Parameters of the utilized dynamic range and color gamut are two independent attributes of video content, and their specification for purposes of digital television and multimedia services are defined by several international standards. For example, ITU-R Rec. 709 defines parameters for high definition television (HDTV) such as Standard Dynamic Range (SDR) and standard color gamut (SCG) and ITU-R Rec.2020 specifies ultra-high definition television (UHDTV) parameters such as HDR and WCG. There are also other standards development organization (SDO) documents specifying these attributes in other systems, e.g., P3 color gamut is defined in the Society of Motion Picture and Television Engineers (SMPTE) document SMPTE-231-2 and some parameters of HDR are defined in SMPTE ST-2084. A brief description of dynamic range and color gamut for video data follows.

Dynamic range is typically defined as the ratio between the minimum and maximum brightness of the video signal. Dynamic range is also measured in terms of 'f-stop', where one f-stop corresponds to a doubling of a signal's dynamic range. In MPEG's definition, HDR content is such content that features a brightness variation with more than 16 f-stops. In some definitions, levels between 10 and 16 f-stops are considered as intermediate dynamic range, but are considered as HDR in other definitions. At the same time, the human visual system (HVS) is capable of perceiving a much larger dynamic range, however HVS includes an adaptation mechanism to narrow a so-called simultaneous range.

Video application and services may be regulated by Rec.709 and provide SDR, typically supporting a range of brightness (or luminance) of around 0.1 to 100 candelas (cd) per m2 (often referred to as "nits"), leading to less than 10 f-stops. Next generation video services are expected to provide a dynamic range of up-to 16 f-stops. Some initial parameters have been specified in SMPTE-2084 and Rec.2020.

Figure 4:
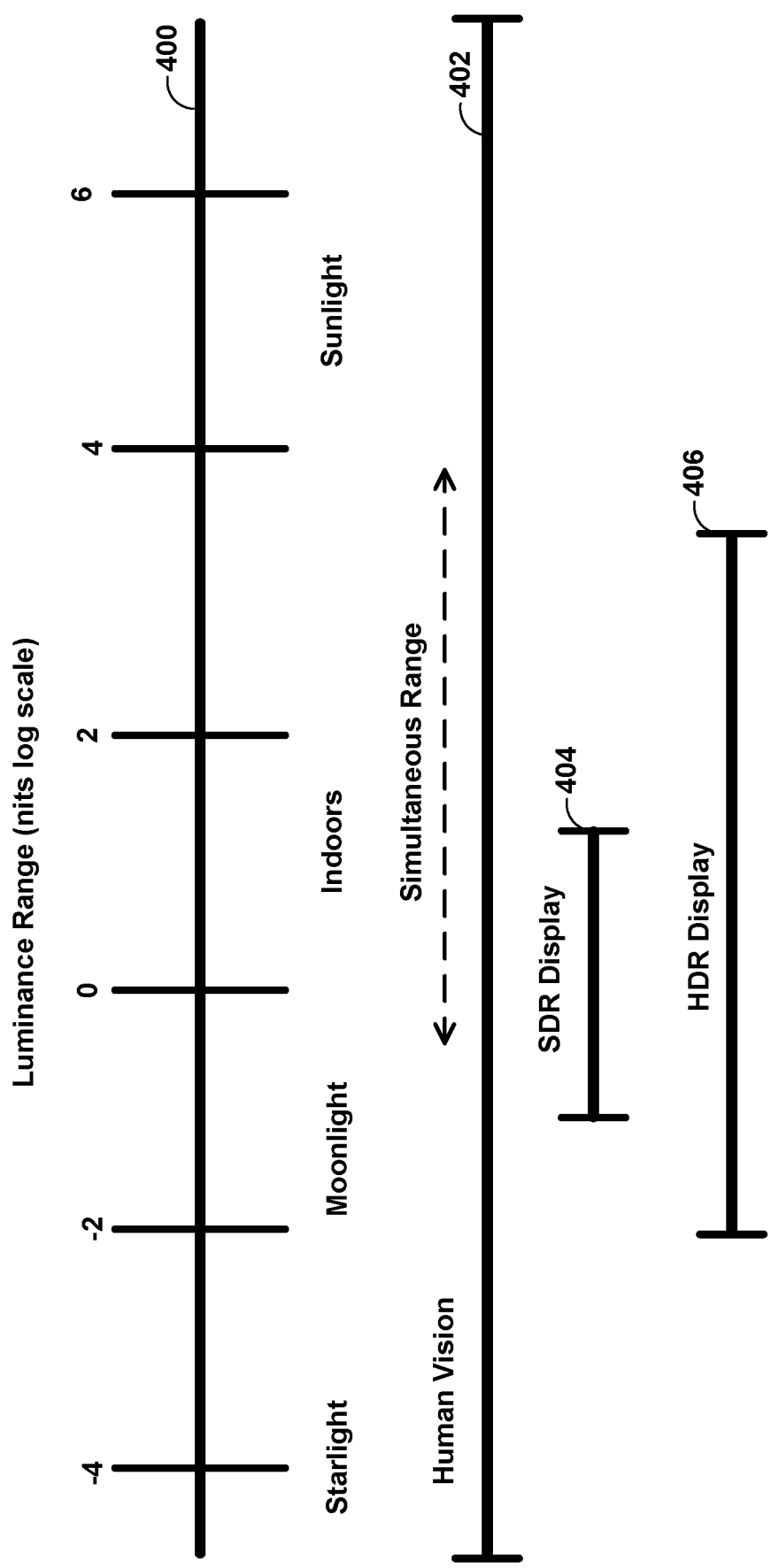
FIG. 4 is a conceptual diagram illustrating human vision and display capabilities.

FIG. 4 is a conceptual diagram illustrating an example dynamic range of SDR in HDTV, an expected HDR in UHDTV and the HVS dynamic range. For example, graph 400 shows luminance of starlight, moonlight, indoors, and sunlight in nits on a logarithmic scale. Graph 402 shows the range of human vision and the HVS simultaneous dynamic range (also called the steady-state dynamic range) with respect to graph 400. Graph 404 depicts the SDR in HDTV for a display with respect to graph 400 and graph 402. For example, the SDR for a display may overlap a portion of the luminance range of moonlight to indoors and may overlap a portion of the HVS simultaneous range. Graph 406 depicts the expected HDR in UHDTV for a display, with respect to graphs 400-404. As can be seen, the HDR is much larger than the SDR of graph 404 and encompasses more of the HVS simultaneous range than the SDR of graph 404.

Figure 5:
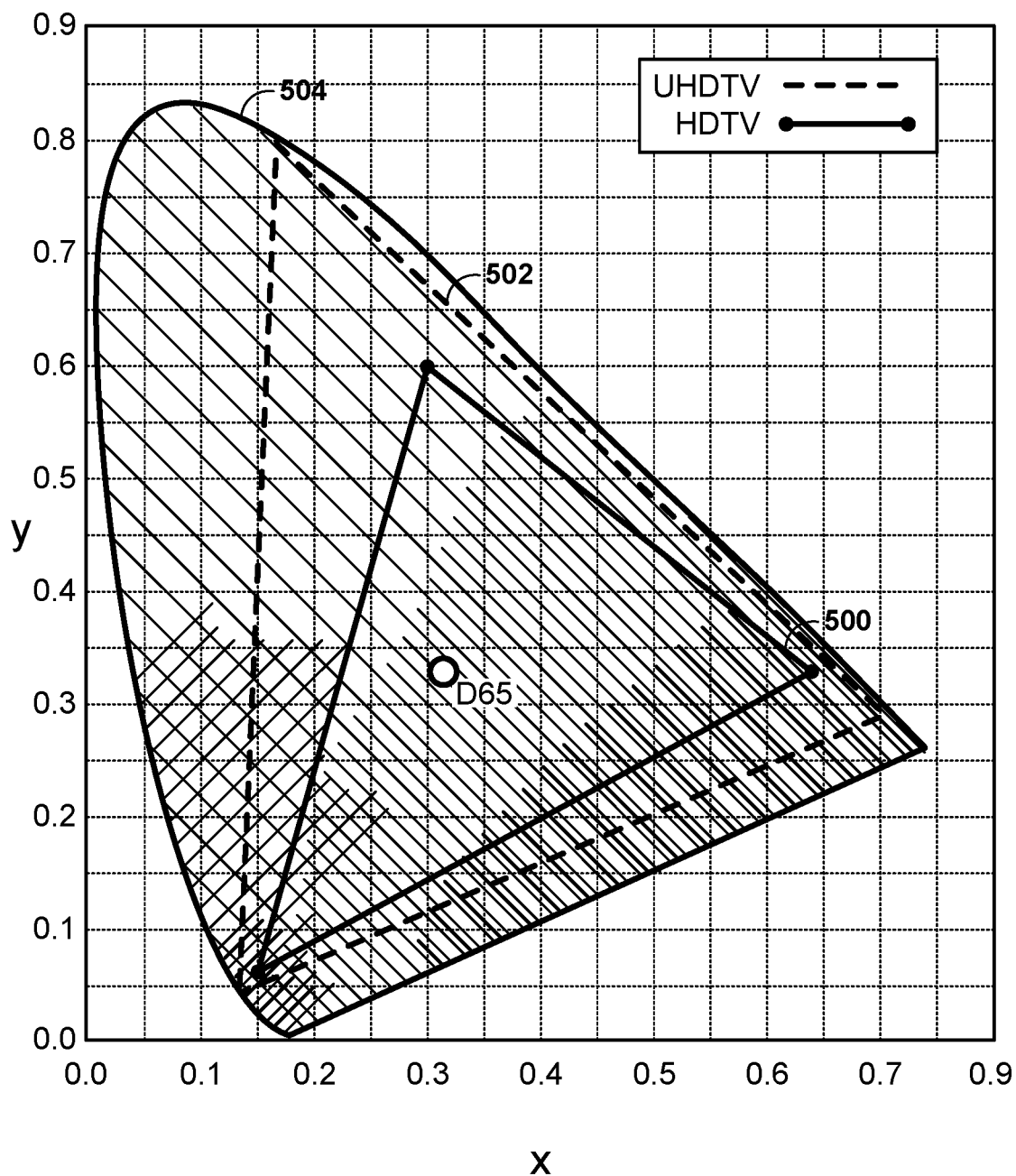
FIG. 5 is a conceptual diagram illustrating color gamut.

Color Gamut is now described. FIG. 5 is a conceptual diagram illustrating an example color gamut graph. An aspect of a more realistic video experience other than HDR is the color dimension, which is conventionally defined by the color gamut. In the example of FIG. 5, a visual representation of SDR color gamut (triangle 500 based on the BT.709 color red, green and blue color primaries), and the wider color gamut that for UHDTV (triangle 502 based on the BT.2020 color red, green and blue color primaries). FIG. 5 also depicts the so-called spectrum locus (delimited by the tongue-shaped area 504), representing limits of natural colors. As illustrated by FIG. 5, moving from BT.709 (triangle 500) to BT.2020 (triangle 502) color primaries aim to provide UHDTV services with about 70% more colors. D65 specifies the white color for given specifications.

A few examples of color gamut specifications are shown in Table 1 below.

TABLE 1

Colorimetry parameters for selected color spaces
RGB color space parameters

| Color space | White point | | Primary colors | | | | | |
|---|---|---|---|---|---|---|---|---|
| | $x_W$ | $y_W$ | $x_R$ | $y_R$ | $x_G$ | $y_G$ | $x_B$ | $y_B$ |
| DCI-P3 | 0.314 | 0.351 | 0.680 | 0.320 | 0.265 | 0.690 | 0.150 | 0.060 |
| ITU-R BT.709 | 0.3127 | 0.3290 | 0.64 | 0.33 | 0.30 | 0.60 | 0.15 | 0.06 |
| ITU-R BT.2020 | 0.3127 | 0.3290 | 0.708 | 0.292 | 0.170 | 0.797 | 0.131 | 0.046 |

Compression of HDR video data is now discussed. HDR/WCG is typically acquired and stored at a very high precision per component (which may even be stored with floating point precision), with the 4:4:4 chroma format and a very wide color space (e.g., XYZ). This representation targets high precision and is (almost) mathematically lossless. However, this format features many redundancies and is not optimal for compression purposes. A lower precision format with an HVS-based assumption is typically utilized for state-of-the-art video applications.

Figure 6:
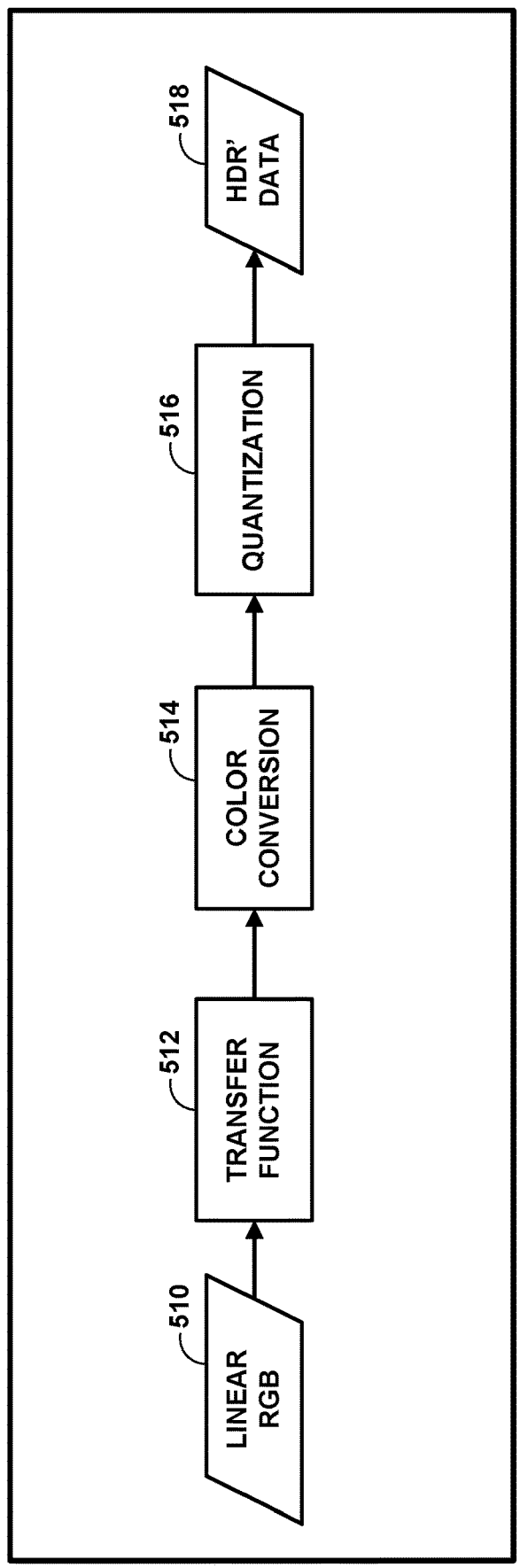
FIG. 6 is a block diagram illustrating an example of HDR/WCG representation conversion.

FIG. 6 is a block diagram illustrating an example format conversion technique. Video encoder 200 may perform the format conversion techniques to transform linear RGB 510 to HDR' data 518. These techniques may include 3 major elements as depicted in FIG. 6. These 3 elements include: 1) Non-linear transfer function (TF) 512 for dynamic range compacting; 2) Color conversion 514 to a more compact or robust color space; and 3) Floating-to-integer representation conversion (Quantization 516).

Figure 7:
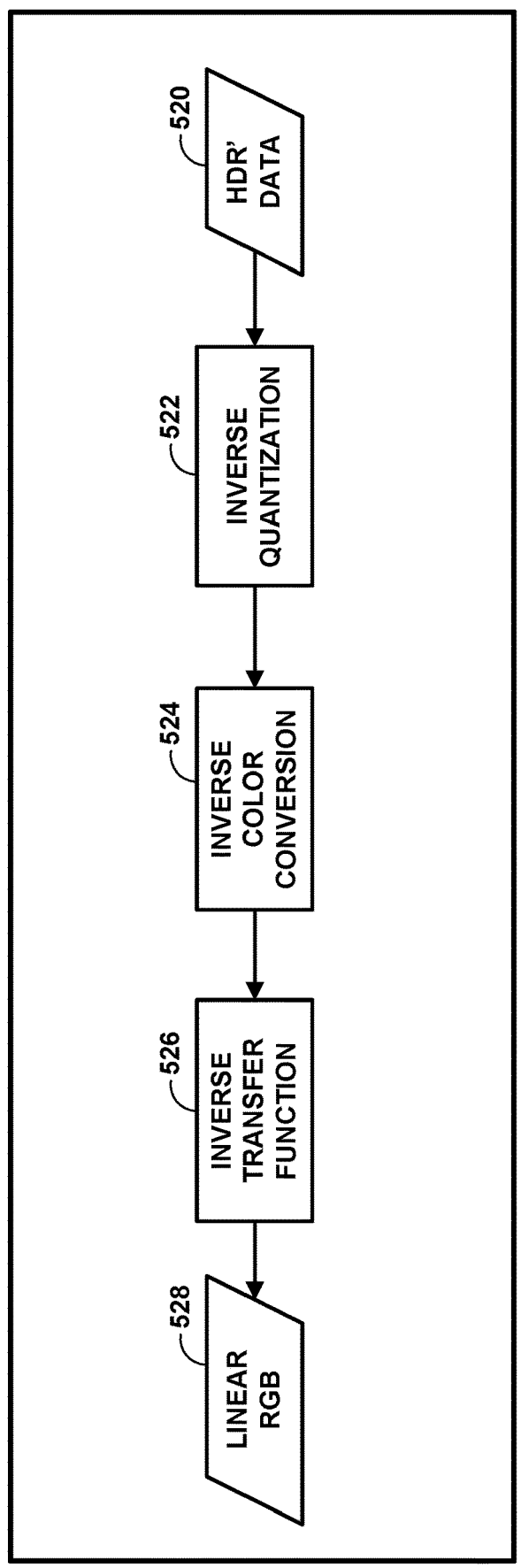
FIG. 7 is a block diagram illustrating an example of inverse HDR/WCG conversion.

FIG. 7 is a block diagram illustrating an example inverse format conversion technique. Video decoder 300 or another processor may perform the inverse conversion techniques of FIG. 7, including inverse quantization 522, inverse color conversion 524, and inverse TF 526 to inverse transform HDR' data 520 to linear RGB 528.

Figure 8:
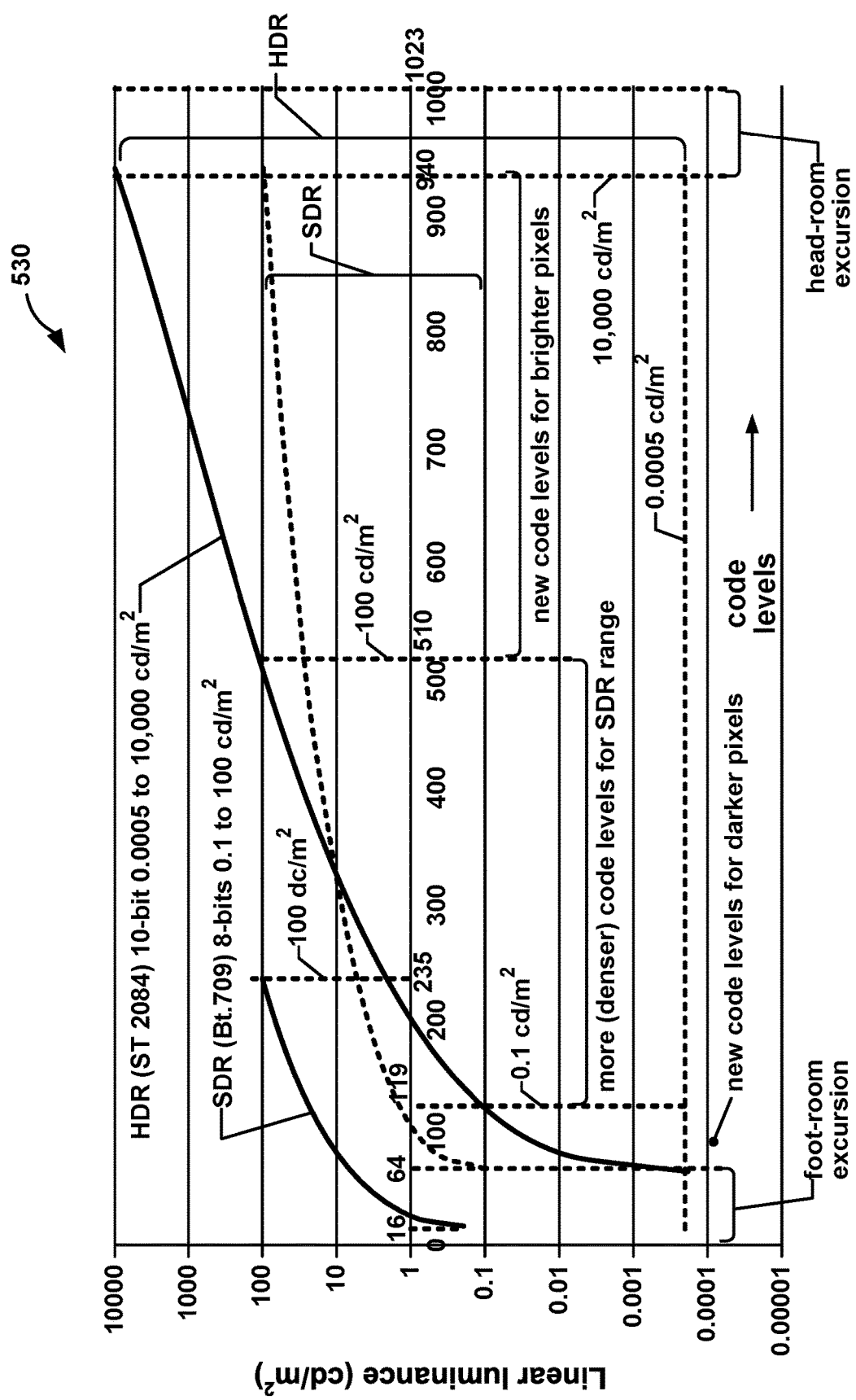
FIG. 8 is a conceptual diagram illustrating examples of a transfer function.

An example Transfer Function (TF) is now described. A TF is applied to the data to compact its dynamic range and make it possible to represent the data with limited number of bits. This function is typically a one-dimensional (1D) non-linear function either reflecting inverse of electro-optical transfer function (EOTF) of the end-user display as specified for SDR in Rec.709 or approximating the HVS perception to brightness changes as for PQ TF specified in SMPTE-2084 for HDR. The inverse process of the OETF is the EOTF (electro-optical transfer function), which maps the code levels back to luminance. FIG. 8 is a conceptual diagram illustrating examples of EOTFs. Graph 530 of FIG. 8 depicts the EOTFs in terms of linear luminance on the y axis and code levels on the x axis. One example EOTF of FIG. 8 is the HDR EOTF of ST2084.

The specification SMPTE ST-2084 defined the EOTF application as follows. A TF is applied to a normalized linear R, G, B values which results in nonlinear representation of R'G'B'. SMPTE ST-2084 defines normalization by NORM=10000, which is associated with a peak brightness of 10000 nits (cd/m2).

$$R' = PQ\_TF(\max(0, \min(R/NORM, 1))) \quad (1)$$

$$G' = PQ\_TF(\max(0, \min(G/NORM, 1)))$$

$$B' = PQ\_TF(\max(0, \min(B/NORM, 1)))$$

with $$PQ\_TF(L) = \left(\frac{c_1 + c_2 L^{m_1}}{1 + c_3 L^{m_1}}\right)^{m_2}$$

where $L$ is the normalized linear $R$, $G$, or $B$ value, $$m_1 = \frac{2610}{4096} \times \frac{1}{4} = 0.1593017578125$$

$$m_2 = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

Figure 9:
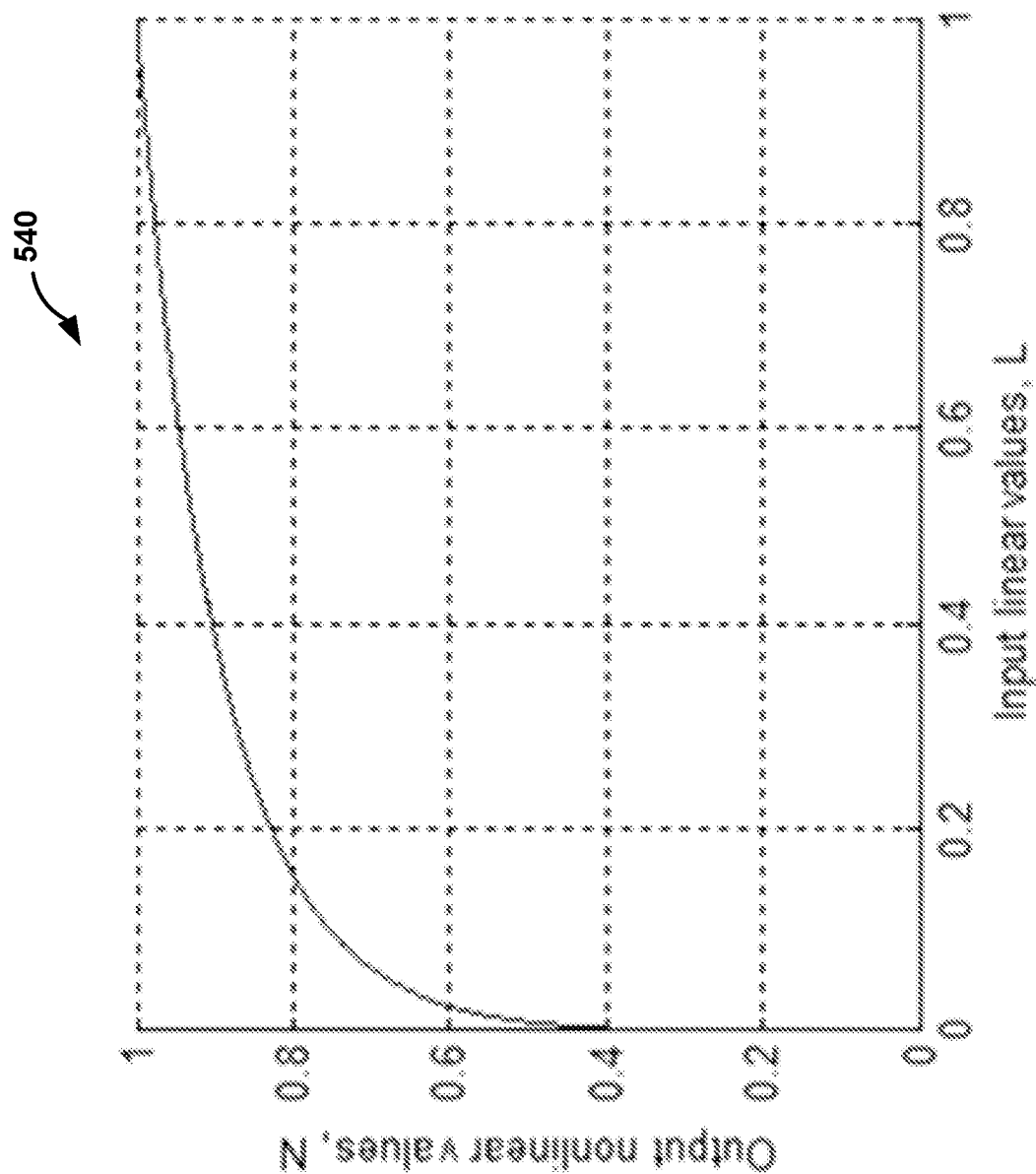
FIG. 9 is a conceptual diagram illustrating a visualization of another example transfer function.

FIG. 9 is a conceptual diagram illustrating a visualization of the PQ TF (SMPTE ST-2084 EOTF). The PQ TF shown in graph 540 of FIG. 9 depicts input values (linear color value) normalized to a range 0 . . . 1 and normalized output values (nonlinear color value). As it is seen from the curve, 1 percent (low illumination) of dynamic range of the input signal is converted to 50% of dynamic range of the output signal.

Typically, an EOTF is defined as a function with floating point accuracy, thus no error is introduced to a signal with this non-linearity if the inverse TF (so called OETF) is applied. The inverse TF (OETF) specified in SMPTE ST-2084 is defined as the inversePQ function:

$$R = 10000 * \text{inversePQ\_TF}(R') \quad (2)$$

$$G = 10000 * \text{inversePQ\_TF}(G')$$

$$B = 10000 * \text{inversePQ\_TF}(B')$$

$$\text{with inversePQ\_TF}(N) = \left(\frac{\max[(N^{1/m_2} - c_2), 0]}{c_2 - c_3 N^{1/m_2}}\right)^{1/m_1}$$

where $N$ is the $R'$, $G'$, or $B'$ value, $$m_1 = \frac{2610}{4096} \times \frac{1}{4} = 0.1593017578125$$

$$m_2 = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

With floating point accuracy, sequential application of EOTF and OETF provides a perfect reconstruction without errors. However, this representation is not optimal for streaming or broadcasting services. More compact representations with fixed bit accuracy of nonlinear R'G'B' data are described in the following sections.

Note, that EOTF and OETF are subjects of very active research, and a TF utilized in some HDR video coding systems may be different from SMPTE ST-2084.

Color transforms are now discussed. RGB data is typically utilized as input, since RGB data is produced by image capturing sensors. However, this color space has high redundancy among components and is not optimal for compact representation. To achieve more compact and more robust representation, RGB components are typically converted to a more uncorrelated color space more suitable for compression, e.g., YCbCr. This color space separates the brightness in the form of luminance (Y) and color information (Cb and Cr) in different un-correlated components.

For modern video coding systems, a typically used color space is YCbCr, as specified in ITU-R BT.709 or ITU-R BT.709. The YCbCr color space in the broadcasting service (television) BT.709 standard specifies the following conversion process from R'G'B' to Y'CbCr (non-constant luminance representation):

$$Y' = 0.2126*R' + 0.7152*G' + 0.0722*B' \quad (3)$$

$$Cb = \frac{B' - Y'}{1.8556}$$

$$Cr = \frac{R' - Y'}{1.5748}$$

The above can also be implemented using the following approximate conversion that avoids the division for the Cb and Cr components:

$$Y'=0.212600*R'+0.715200*G'+0.072200*B'$$

$$Cb=-0.114572*R'-0.385428*G'+0.500000*B'$$

$$Cr=0.500000*R'-0.454153*G'-0.045847*B' \quad (4)$$

The ITU-R BT.2020 standard specifies the following conversion process from R'G'B' to Y'CbCr (non-constant luminance representation):

$$Y' = 0.2627*R' + 0.6780*G' + 0.0593*B' \quad (4)$$

$$Cb = \frac{B' - Y'}{1.8814}$$

$$Cr = \frac{R' - Y'}{1.4746}$$

The above can also be implemented using the following approximate conversion that avoids the division for the Cb and Cr components:

$$Y'=0.262700*R'+0.678000*G'+0.059300*B'$$

$$Cb=-0.139630*R'-0.360370*G'+0.500000*B'$$

$$Cr=0.500000*R'-0.459786*G'-0.040214*B' \quad (6)$$

It should be noted, that both color spaces remain normalized, therefore, for the input values normalized in the range 0 ... 1, the resulting values will be mapped to the range 0 ... 1. Generally, color transforms implemented with floating point accuracy provide perfect reconstruction, thus this process is lossless.

Quantization/fix point conversion is now discussed. The processing stages described above may be implemented in floating point accuracy representation, thus they may be considered as lossless. However, this type of accuracy may be considered as redundant and expensive for most of consumer electronics applications. In some examples, input data in a target color space is converted to a target bit-depth fixed point accuracy. Certain studies show that 10-12 bits accuracy in combination with the PQ TF is sufficient to provide HDR data of 16 f-stops with distortion below the Just-Noticeable Difference. The Just-Noticeable Difference is the amount something must be changed in order for the difference to be noticeable or detectable at least half the time. Data represented with 10 bits accuracy can be further coded with most of the state-of-the-art video coding solutions. This conversion process includes signal quantization and is an element of lossy coding and is a source of inaccuracy introduced to converted data.

An example of such quantization applied to code words in a target color space (e.g., YCbCr) is shown below. Input values YCbCr represented in floating point accuracy are converted into a signal of fixed bit-depth BitDepthY for the Y value and BitDepthC for the chroma values (Cb, Cr), where $D_{Y'}$ represents the converted luma signal, and $D_{Cb}$ and $D_{Cr}$ represent the converted chroma signals $$D_{Y'}=\text{Clip1}_Y(\text{Round}((1<<(\text{BitDepth}_Y-8))*(219*Y'+16)))$$

$$D_{Cb}=\text{Clip1}_C(\text{Round}((1<<(\text{BitDepth}_C-8))*(224*Cb+128)))$$

$$D_{Cr}=\text{Clip1}_C(\text{Round}((1<<(\text{BitDepth}_C-8))*(224*Cr+128))) \quad (7)$$

where x represents the rounding operation formula in equation 7 within for a given luma or chroma component, Round(x)=Sign(x)*Floor(Abs(x)+0.5), Sign(x)=−1 if x<0, 0 if x=0, 1 if x>0

Floor(x) the largest integer less than or equal to x

Abs(x)=x if x>=0, −x if x<0

$\text{Clip1}_Y(x)$=Clip3(0,(1<<BitDepth$_Y$)−1,x)

$\text{Clip1}_C(x)$=Clip3(0,(1<<BitDepth$_C$)−1,x)

Clip3(x,y,z)=x if z<x, y if z>y, z otherwise

Dynamic Range Adjustment (DRA) is now discussed. DRA was initially proposed in Dynamic Range Adjustment SEI to enable High Dynamic Range video coding with Backward-Compatible Capability, D. Rusanovskyy, A. K. Ramasubramonian, D. Bugdayci, S. Lee, J. Sole, M. Karczewicz, VCEG document COM16-C 1027-E, September 2015.

The authors proposed to implement DRA as a piece-wise linear function f(x) that is defined for a group of non-overlapped dynamic range partitions (ranges) {Ri} of input value x, where i is an index of the range with range of 0 to N−1, inclusive, and where N is the total number of ranges {Ri} utilized for defining DRA function. For example, ranges of the DRA are defined by a minimum and a maximum x value that belong to the range Ri, e.g. [$x_i$, $x_{i+1}$−1] where $x_i$ and $x_{i+1}$ denote the minimum value of the ranges $R_i$ and $R_{i+1}$ respectively. Applied to the Y color component of the video (luma), DRA function Sy is defined through a scale $S_{y,i}$ and an offset $O_{y,i}$ which are applied to every x∈[$x_i$, $x_{i+1}$−1], thus $S_y$={$S_{y,i}$,$O_{y,i}$}.

With this, for any Ri, and every x∈[$x_i$, $x_{i+1}$−1], the output value X is calculated as follows:

$$X=S_{y,i}*(x-O_{y,i}) \quad (8)$$

For the inverse DRA mapping process for luma component Y conducted at the decoder (e.g., video decoder 300) or another processor, DRA function Sy is defined by inverse of scale $S_{y,i}$ and offset $O_{y,i}$ values which are applied to every X∈[$X_i$, $X_{i+1}$−1].

With this, for any Ri, and every X∈[$X_i$, $X_{i+1}$−1], reconstructed value x is calculated as follows:

$$x=X/S_{y,i}+O_{y,i} \quad (9)$$

The forward DRA mapping process for chroma components Cb and Cr were defined as follows. An example is given with the term "u" denoting a sample of Cb color component that belongs to range Ri, u∈[$u_i$,$u_{i+1}$−1], thus $S_u$={$S_{u,i}$,$O_{u,i}$}:

$$U=S_{u,i}*(u-O_{y,i})+\text{Offset} \quad (10)$$

where Offset is equal to $2^{(bitdepth-1)}$ and denotes the bi-polar Cb, Cr signal offset.

The inverse DRA mapping process conducted at the decoder for chroma components Cb and Cr were defined as follows. An example is given with U term denoting a sample of a remapped Cb color component which belongs to the range Ri, $U \in [U_i, U_{i+1}-1]$:

$$u = (U - \text{Offset})/S_{u,i} O_{y,i} \quad (11)$$

where Offset is equal to $2^{(bitdepth-1)}$ and denotes the bi-polar Cb, Cr signal offset.

Luma-driven chroma scaling (LCS) is now discussed. In JCTVC-W0101, HDR CE2: Report on CE2.a-1 LCS, A. K. Ramasubramanian, J. Sole, D. Rusanovskyy, D. Bugdayci, M. Karczewicz, techniques to adjust chroma information were disclosed, e.g. Cb and Cr, by exploiting brightness information associated with the processed chroma sample. Similarly, the DRA approach of Dynamic Range Adjustment SEI to enable High Dynamic Range video coding with Backward-Compatible Capability, D. Rusanovskyy, A. K. Ramasubramanian, D. Bugdayci, S. Lee, J. Sole, M. Karczewicz, VCEG document COM16-C 1027-E, September 2015, proposed to apply, to a chroma sample, a scale factor $S_u$ for Cb and $S_{v,i}$ for Cr. However, instead of defining the DRA function as a piece-wise linear function $S_u = \{S_{u,i}, O_{u,i}\}$ for a set of ranges $\{R_i\}$ accessible by chroma value u or v as in Equations (3) and (4), the LCS approach proposed to utilize a luma value Y to derive a scale factor for a chroma sample. With this, forward LCS mapping of the chroma sample u (or v) is conducted as:

$$U = S_{u,i}(Y) * (u - \text{Offset}) + \text{Offset} \quad (12)$$

The inverse LCS process conducted at the decoder side is defined as follows:

$$u = (U - \text{Offset})/S_{u,i}(Y) + \text{Offset} \quad (13)$$

In more details, for a given pixel located at (x, y), chroma samples Cb(x, y) or Cr(x, y) are scaled with a factor derived from the pixel's LCS function $S_{Cb}$ (or $S_{Cr}$) accessed by the pixel's luma value Y'(x, y).

At the forward LCS (e.g., video encoder 200) for chroma samples, Cb (or Cr) values and their associated luma value Y' are taken as an input to the chroma scale function $S_{Cb}$ (or $S_{Cr}$) and Cb or Cr are converted into Cb' and Cr' as shown in Equation (14). At the decoder side (e.g., video decoder 300), the inverse LCS is applied, reconstructed Cb' or Cr' are converted to Cb, or Cr as it shown in Equation (15).

$$Cb'(x, y) = S_{Cb}(Y'(x, y)) * Cb(x, y), \quad (14)$$
$$Cr'(x, y) = S_{Cr}(Y'(x, y)) * Cr(x, y)$$

$$Cb(x, y) = \frac{Cb'(x, y)}{S_{Cb}(Y'(x, y))} \quad (15)$$

$$Cr(x, y) = \frac{Cr'(x, y)}{S_{Cr}(Y'(x, y))}$$

Figure 10:
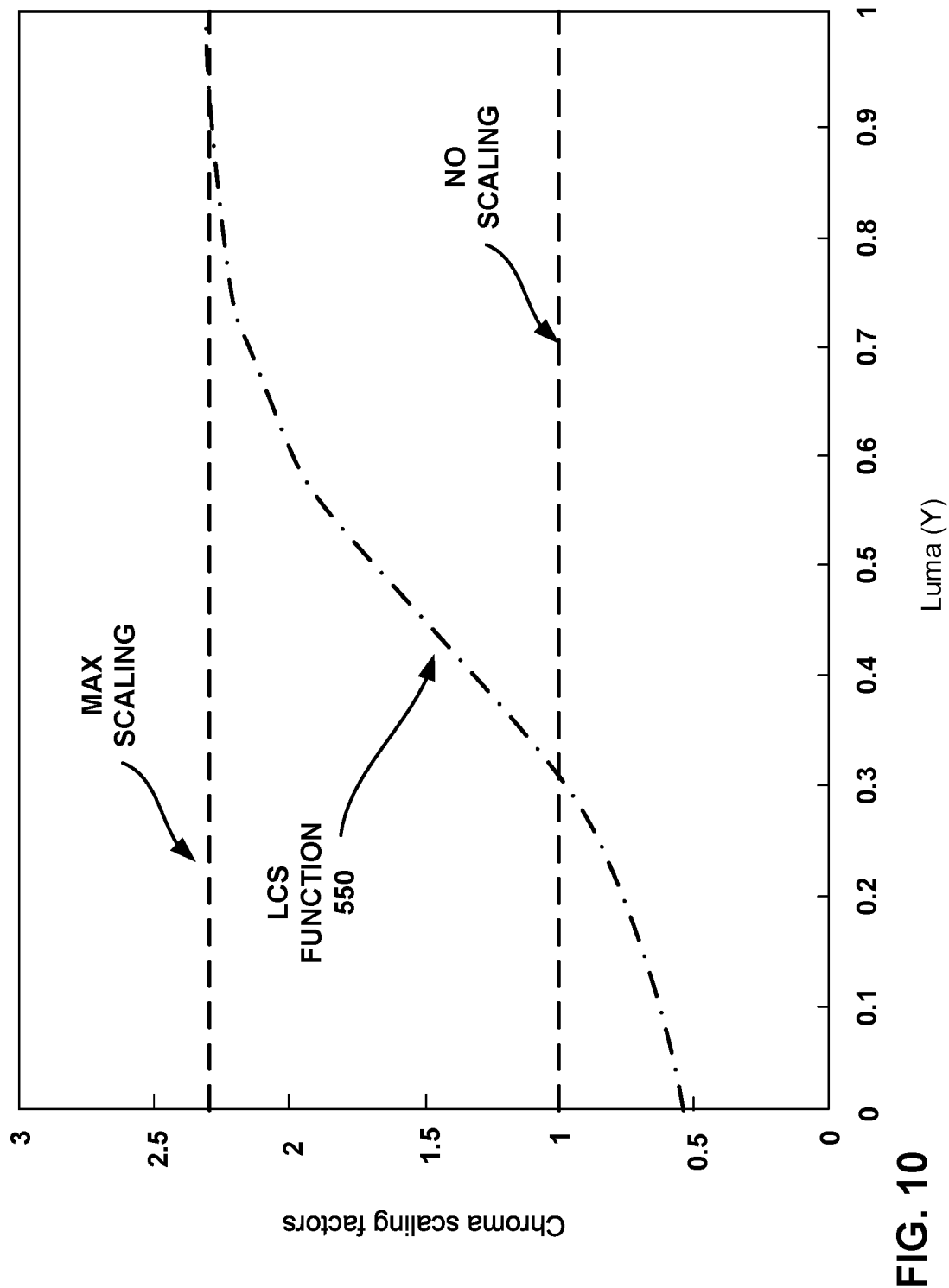
FIG. 10 is a conceptual diagram illustrating an example of a luma-driven chroma scaling (LCS) function.

FIG. 10 is a conceptual diagram illustrating an example of LCS function. With LCS function 550, chroma components of pixels with smaller values of luma are multiplied with smaller scaling factors.

The relationship between DRA sample scaling and QPs of video codecs is now discussed. To adjust compression ratio at video encoders, block transform-based video coding schemes such as HEVC utilize a scalar quantizer which is applied to block transform coefficients.

$$Xq = X/\text{scaler}QP$$

where Xq is a quantized codevalue of the transform coefficient X produced by applying scaler scalerQP derived from QP parameter; in most codecs, the quantized codevalue would be approximated to an integer value (e.g., by rounding); in some codecs (e.g., video encoder 200 or video decoder 300) the quantization may be a different function which depends not just on the QP, but also on other parameters of the codec.

Scaler value scalerQP is controlled with Quantization Parameter (QP) with the relationship between QP and scalar quantizer defined as following, where k is a known constant:

$$\text{scaler}QP = k * 2^{(QP/6)} \quad (16)$$

The inverse function defines relationship between scalar quantizer applied to transform coefficient and QP of the HEVC as following:

$$QP = \ln(\text{scaler}QP/k) * 6/\ln(2); \quad (17)$$

Respectively, additive change in the QP value, e.g., deltaQP, would result in multiplicative change in the scalerQP value applied to the transform coefficients.

DRA is effectively applying scaleDRA value to the pixel sample values, and taking into consideration transform properties, can be combined with scalerQP values as follows:

$$Xq = T(\text{scaleDRA} * x)/\text{scale}QP$$

where Xq are quantized transform coefficients produced by transform T of the scaled x sample values and scaled with scaleQP applied in transform domain. Thus, applying multiplicator scaleDRA in the pixel domain results in an effective change of scaler quantizer scaleQP, which is applied in the transform domain. This in turn can be interpreted in the additive change of the QP parameter applied to the current processed block of data:

$$dQP = \log 2(\text{scaleDRA}) * 6; \quad (18)$$

where dQP is an approximate QP offset introduced by HEVC by deploying DRA on the input data.

Chroma QP dependency on the luma QP value is now discussed. Some of state-of-the-art video coding designs, such as HEVC and newer designs, may utilize a predefined dependency between luma and chroma QP values effectively applied to process currently coded block Cb. Such dependency may be utilized to achieve an optimal bitrate allocation between luma and chroma components.

An example of such a dependency is represented by Table 8-10 of the HEVC specification, where the QP value applied for decoding of the chroma samples are derived from QP values utilized for decoding luma samples. The relevant section where the chroma QP value is derived based on the QP value of the corresponding luma sample (QP value applied to the block/TU, corresponding luma sample belongs to), chroma QP offsets and Table 8-10 of HEVC specification is reproduced below:

When ChromaArrayType is not equal to 0, the following applies:

The variables $qP_{Cb}$ and $qP_{Cr}$ are derived as follows:

If tu_residual_act_flag[xTbY][yTbY] is equal to 0, the following applies:

$$qPi_{Cb} = \text{Clip3}(-QpBd\text{Offset}_C, 57, Qp_Y + pps\_cb\_qp\_\text{offset} + \text{slice}\_cb\_qp\_\text{offset} + CuQp\text{Offset}_{Cb}) \quad (8-287)$$

$$qPi_{Cr} = \text{Clip3}(-QpBd\text{Offset}_C, 57, Qp_Y + pps\_cr\_qp\_\text{offset} + \text{slice}\_cr\_qp\_\text{offset} + CuQp\text{Offset}_{Cr}) \quad (8-288)$$

Otherwise (tu_residual_act_flag[xTbY][yTbY] is equal to 1), the following applies:

$$qPi_{Cb}=\text{Clip3}(-QpBd\text{Offset}C, 57, QpY+Pps\text{Act}QpOffsetCb+\text{slice\_act\_cb\_qp\_offset}+CuQp\text{Offset}Cb) \quad (8\text{-}289)$$

$$qPi_{Cr}=\text{Clip3}(-QpBd\text{Offset}C, 57, QpY+Pps\text{Act}QpOffsetCr+\text{slice\_act\_cr\_qp\_offset}+CuQp\text{Offset}Cr) \quad (8\text{-}290)$$

If ChromaArrayType is equal to 1, the variables $qP_{Cb}$ and $qP_{Cr}$ are set equal to the value of Qpc as specified in Table 8-10 based on the index qPi equal to $qPi_{Cb}$ and $qPi_{Cr}$, respectively.

Otherwise, the variables $qP_{Cb}$ and $qP_{Cr}$ are set equal to Min(qPi, 51), based on the index qPi equal to $qPi_{Cb}$ and $qPi_{Cr}$, respectively.

The chroma quantization parameters for the Cb and Cr components, $Qp'_{Cb}$ and $Qp'_{Cr}$, are derived as follows:

$$Qp'_{Cb}=qP_{Cb}+QpBd\text{Offset}_C \quad (8\text{-}291)$$

$$Qp'_{Cr}=qP_{Cr}+QpBd\text{Offset}_C \quad (8\text{-}292)$$

FIG. 11 is a conceptual diagram illustrating an example table specifying Qpc as a function of qPi. In some examples, the table of FIG. 11 is Table 8-10 of the HEVC specification. Table 8-10 (560) details the specification of Qpc as a function of qPi for ChromaArrayType equal to 1.

Derivation of chroma scale for DRA is now discussed. In video coding systems (such as video encoder 200 or video decoder 300) employing both the uniform scalar quantization in transform domain and pixel domain scaling with DRA, derivation of the scale DRA value applied to chroma samples (Sx) may be dependent on following:

$S_Y$: Luma scale value of the associated luma sample.
$S_{CX}$: Scale derived from the gamut of the content, where CX stands for Cb or Cr as applicable.
$S_{corr}$: correction scale term to account for a mismatch in transform coding and DRA scaling, e.g., to compensate for the dependency introduced by Table 8-10 of HEVC.

$$S_X=\text{fun}(S_Y, S_{CX}, S_{corr}).$$

One example is a separable function defined as follows: $S_X=f1(S_Y)*f2(S_{CX})*f3(S_{corr})$, where f1 is a first portion of a separable function, f2 is a second portion of the separable function, and f2 is the third portion of the separable function.

A Bumping process is now described. The decoded picture buffer (DPB), e.g., DPB 218 or DPB 314, maintains a set of pictures/frames that may be used as a reference(s) for inter-picture prediction in the coding loop of the codec, e.g., video encoder 200 or video decoder 300. Depending on the coding state, one or more pictures may be output for consumption by an external application or be read by an external application. Depending on a coding order, DPB size or other condition, a picture that has no longer has a use in the coding loop and was consumed by an external application may be removed from DPB 314 (FIG. 3) or be replaced by a newer reference picture. The process to output of pictures from DPB 314 and potential removal of pictures from DPB (FIG. 3) is referred to as a bumping process. An example of a bumping process defined for HEVC is reproduced below:

C.5.2.4 "Bumping" Process
The "bumping" process consists of the following ordered steps:
1. The picture that is first for output is selected as the one having the smallest value of PicOrderCntVal of all pictures in the DPB marked as "needed for output".
2. The picture is cropped, using the conformance cropping window specified in the active SPS for the picture, the cropped picture is output, and the picture is marked as "not needed for output".
3. When the picture storage buffer that included the picture that was cropped and output contains a picture marked as "unused for reference", the picture storage buffer is emptied.
   NOTE—For any two pictures picA and picB that belong to the same CVS [coded video sequence] and are output by the "bumping process", when picA is output earlier than picB, the value of PicOrderCntVal of picA is less than the value of PicOrderCntVal of picB.

The bumping process with DRA is now discussed. DRA normative postprocessing was adopted to the draft text of the EVC specification in the form of a modified bumping process. An excerpt from the EVC specification text covering the bumping process with changes are shown in between the marks <CHANGE> and </CHANGE>.

Annex C Hypothetical Reference Decoder

Figure 12:
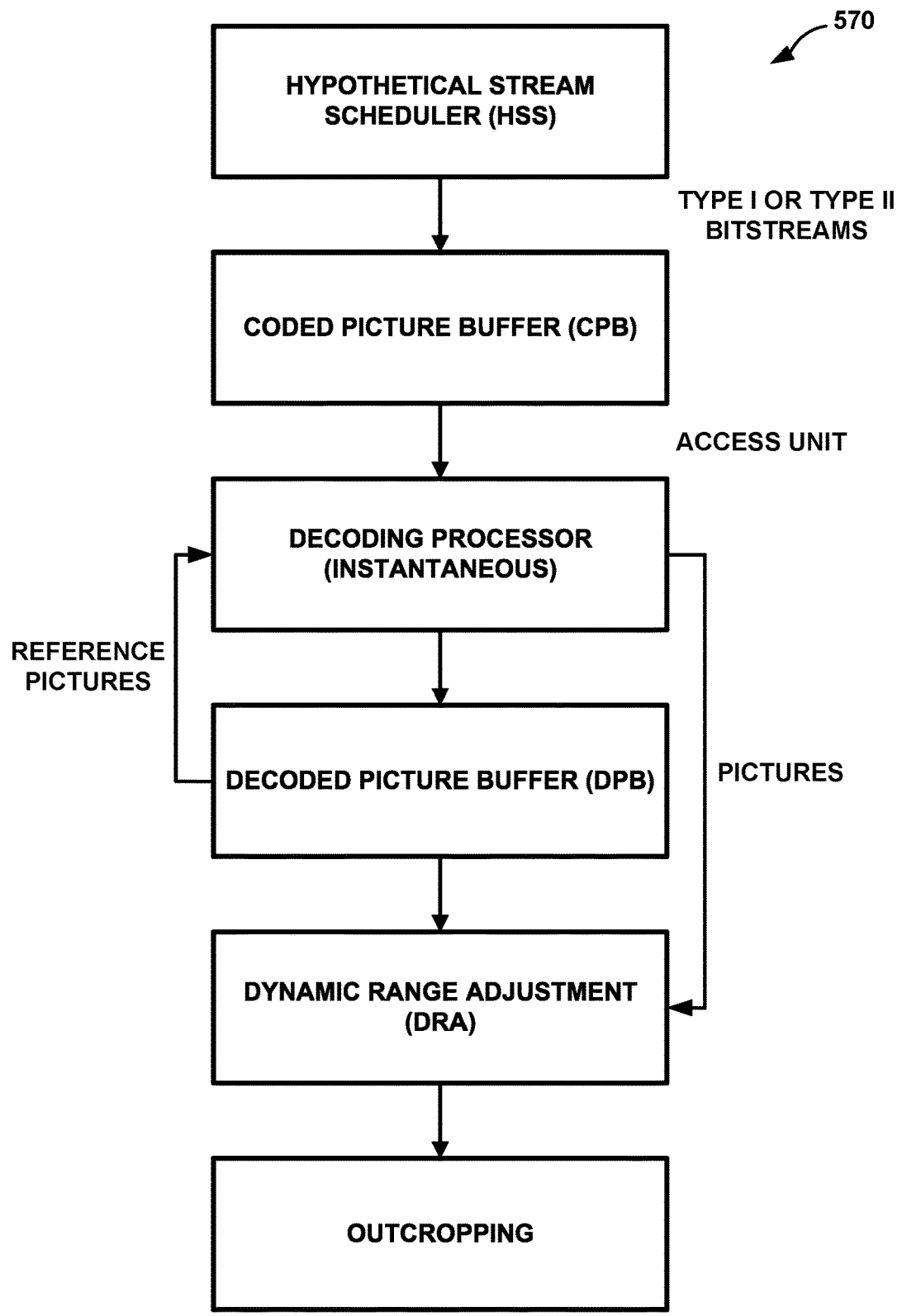
FIG. 12 is a conceptual diagram illustrating an example of a HDR buffer model.

The HRD [hypothetical reference decoder] contains a coded picture buffer (CPB), an instantaneous decoding process, a decoded picture buffer (DPB), output DRA [which is an additional process over some video codecs] and cropping as shown in Figure C-2 [which is reproduced as FIG. 12 of this disclosure]. FIG. 12 is a conceptual diagram illustrating an example of a HDR buffer model.

The operation of the DPB is specified in subclause C.3. The output DRA process and cropping are specified in subclauses C.3.3 and C.5.2.4.

C.3.3 Picture Decoding and Output

Picture n is decoded and its DPB output time $t_{o,dpb}(n)$ is derived by $$t_{o,dpb}(n)=t_r(n)+t_c*dpb\_output\_delay(n) \quad (C\text{-}12)$$

The output of the current picture is specified as follows.
If $t_{o,dpb}(n)=t_r(n)$, the current picture is output.
Otherwise ($t_{o,dpb}(n)>t_r(n)$), the current picture is output later and will be stored in the DPB (as specified in subclause C.2.4) and is output at time $t_{o,dpb}(n)$ unless indicated not to be output by the decoding or inference of no_output_of_prior_pics_flag equal to 1 at a time that precedes $t_{o,dpb}(n)$.

<CHANGE> The output picture shall be derived by invoking the DRA process specified in subclause 8.9.2 and cropped, using the cropping rectangle specified in the SPS for the sequence.</CHANGE>

When picture n is a picture that is output and is not the last picture of the bitstream that is output, the value of $\Delta t_{o,dpb}(n)$ is defined as:

$$\Delta t_{o,dpb}(n)=t_{o,dpb}(n_n)-t_{o,dpb}(n) \quad (C\text{-}13)$$

where $n_n$ indicates the picture that follows after picture n in output order.

The decoded picture is stored in the DPB.

C.5.2.4 "Bumping" Process

The "bumping" process is invoked in the following cases.
The current picture is an IDR picture and no_output_of_prior_pics_flag is not equal to 1 and is not inferred to be equal to 1, as specified in subclause C.5.2.2.
There is no empty picture storage buffer (i.e., DPB fullness is equal to DPB size) and an empty picture storage buffer is needed for storage of a decoded picture, as specified in subclause.

The "bumping" process consists of the following ordered steps:

<CHANGE>
4. The picture that is first for output is selected as the one having the smallest value of PicOrderCntVal of all pictures in the DPB marked as "needed for output". The selected picture consists of a pic_width_in_luma_samples by pic_height_in_luma_samples array of luma samples currPicL and two PicWidthInSamplesC by PicHeightInSamplesC arrays of chroma samples currPicCb and currPicCr. The sample arrays currPicL, currPicCb and currPicCr correspond to decoded sample arrays $S_L$, $S_{Cb}$ and $S_{Cr}$.
5. When dra_table_present_flag is equal to 1, DRA derivation process specified in clause 8.9 is invoked with selected picture as input and output picture as output, otherwise, the sample arrays of output picture are initialized by the sample arrays of the selected picture.
</CHANGE>
6. The output picture is cropped, using the conformance cropping window specified in the active SPS for the picture, the cropped picture is output, and the picture is marked as "not needed for output".
7. When the picture storage buffer that included the picture that was <CHANGE> mapped, </CHANGE> cropped and output contains a picture marked as "unused for reference", the picture storage buffer is emptied.

APS signaling of DRA data is now discussed. The EVC specification defines that DRA parameters are signaled in an Adaptation Parameter Set (APS). Syntax and semantics of DRA parameters are provided below:

| | Descriptor |
|---|---|
| seq_parameter_set_rbsp( ) { | |
| ... | |
| sps_dra_flag | u(1) |
| ... | |

| | Descriptor |
|---|---|
| pic_parameter_set_rbsp( ) { | |
| ... | |
| if( sps_dra_flag ) { | |
| pic_dra_enabled_present_flag | u(1) |
| if( pic_dra_enabled_present_flag ) { | |
| pic_dra_enabled_flag | u(1) |
| if( pic_dra_enabled_ flag ) | |
| pic_dra_aps_id | u(3) |
| } | |
| } | |
| ... | |

| | Descriptor |
|---|---|
| adaptation_parameter_set_rbsp( ) { | |
| adaptation_parameter_set_id | u(5) |
| aps_params_type | u(3) |
| if( aps_params_type = = ALF_APS ) | |
| alf_data( ) | |
| else if( aps_params_type = = DRA_APS ) | |
| <CHANGE> dra_data( ) </CHANGE> | |
| aps_extension_flag | u(1) |
| if( aps_extension_flag ) | |
| while( more_rbsp_data( ) ) | |
| aps_extension_data_flag | u(1) |
| rbsp_trailing_bits( ) | |
| } | |

DRA Data Syntax

| | Descriptor |
|---|---|
| dra_data() { | |
| dra_descriptor1 | u(4) |
| dra_descriptor2 | u(4) |
| dra_number_ranges_minus1 | ue(v) |
| dra_equal_ranges_flag | u(1) |
| dra_global_offset | u(v) |
| if( dra_equal_ranges_flag ) | u(1) |
| dra_delta_range[ 0 ] | u(v) |
| else | |
| for( j = 0; j <= dra_number_ranges_minus1; j++ ) | |
| dra_delta_range[ j ] | u(v) |
| for( j = 0; j <= dra_number_ranges_minus1; j++ ) | |
| dra_scale_value[ j ] | u(v) |
| dra_cb_scale_value | u(v) |
| dra_cr_scale_value | u(v) |
| dra_table_idx | ue(v) |
| } | | sps_dra_flag equal to 1 specifies that the dynamic range adjustment mapping on output samples is used. sps_dra_flag equal to 0 specifies that dynamic range adjustment mapping on output samples is not used.

pic_dra_enabled_present_flag equal to 1 specifies that pic_dra_enabled_flag is present in the PPS. pic_dra_enabled_present_flag equal to 0 specifies that pic_dra_enabled_flag is not present in the PPS. When pic_dra_enabled_present_flag is not present, it is inferred to be equal to 0.

pic_dra_enabled_flag equal to 1 specifies that DRA is enabled for all decoded picture referring to the PPS. pic_dra_enabled_flag equal to 0 specifies that DRA is note enabled for all decoded pictures referring to the PPS. When not present, pic_dra_enabled_flag is inferred to be equal to 0.

pic_dra_aps_id specifies the adaptation_parameter_set_id of the DRA APS that is enabled for decoded pictures referring to the PPS.

adaptation_parameter_set_id provides an identifier for the APS for reference by other syntax elements.

aps_params_type specifies the type of APS parameters carried in the APS as specified in Table 6 [shown as Table 2 in this disclosure].

TABLE 2

APS parameters type codes and types of APS parameters

| aps_params_type | Name of aps_params_type | Type of APS parameters |
|---|---|---|
| 0 | ALF_APS | ALF parameters |
| 1 | DRA_APS | DRA parameters |
| 2 . . . 7 | Reserved | Reserved | dra_descriptor1 shall be in the range of 0 to 15, inclusive. In the current version of the specification value of syntax element dra_descriptor1 is restricted to 4, other values are reserved for future use.

dra_descriptor2 specifies the accuracy of the fractional part of the DRA scale parameters signaling and the reconstruction process. The value of dra_descriptor2 shall be in the range of 0 to 15, inclusive. In the current version of the specification value of syntax element dra_descriptor2 is restricted to 9, other values are reserved for future use.

The variable numBitsDraScale is derived as follows:

numBitsDraScale=*dra*_descriptor1+*dra*_descriptor2 dra_number_ranges_minus1 plus 1 specifies the number of ranges signalled to describe the DRA table. The value of dra_number_ranges_minus1 shall be in the range of 0 to 31, inclusive.

dra_equal_ranges_flag equal to 1 specifies that the DRA table is derived using equal-sized ranges, with size specified by the syntax element dra delta range[0]. dra_equal_ranges_flag equal to 0 specifies that the DRA table is derived using dra_number_ranges, with the size of each of the ranges specified by the syntax element dra_delta_range[j].

dra_global_offset specifies that the starting codeword position utilized to derive DRA table and initializes the variable inDraRange[0] as follows:

inDraRange[0]=*dra*_global_offset

The number of bits used to signal dra_global_offset is $BitDepth_Y$ bits.

dra_delta_range[j] specifies the size of the j-th range in codewords which is utilized to derive the DRA table. The value of dra_delta_range[j] shall be in the range of 1 to $(1<<BitDepth_Y)-1$, inclusive.

The variable inDraRange[j] for j in the range of 1 to dra_number_ranges_minus1, inclusive, are derived as follows:

inDraRange[j]=inDraRange[j−1]+(dra_equal_ranges_flag==1)? dra_delta_range[0]:dra_delta_range[j]

It is requirements of the bitstream conformance that inDraRange[j] shall be in the range 0 to $(1<<BitDepth_Y)-1$.

dra_scale_value[j] specifies the DRA scale value associated with j-th range of the DRA table. The number of bits used to signal dra scale value[j] is equal to numBitsDraScale.

dra_cb_scale_value specifies the scale value for chroma samples of Cb component utilized to derive the DRA table. The number of bits used to signal dra_cb_scale_value is equal to numBitsDraScale. In the current version of the specification value of syntax element dra_cb_scale_value shall be less then 4<<dra_descriptor2, other values are reserved for future use.

dra_cr_scale_value specifies the scale value for chroma samples of Cr component utilized to derive the DRA table. The number of bits used to signal dra_cr_scale_value is equal to numBitsDraScale bits. In the current version of the specification value of syntax element dra_cb_scale_value shall be less then 4<<dra_descriptor2, other values are reserved for future use.

The values of dra scale value[j], dra_cb_scale_value and dra_cr_scale_value shall not be equal to 0.

dra_table_idx specifies the access entry of the ChromaQpTable utilized to derived the chroma scale values. The value of dra_table_idx shall be in the range of 0 to 57, inclusive.

In some examples of the MPEG EVC specification, signaling of the DRA parameters feature parsing dependencies for certain syntax elements in the PPS (picture header) and the APS (adaptation parameter set) based on certain syntax elements signaled in an SPS. These dependencies may be undesirable as video decoder 300 may have to wait on an SPS prior to parsing the PPS and/or the APS, which may introduce decoding latency. For example, parsing of the syntax elements pic_dra_enabled_present_flag, pic_dra_enabled_flag, and pic_dra_aps_id may be dependent on a value of the syntax element sps_dra_flag in the SPS. For example, parsing of the syntax elements dra global offset and dra_delta_range[j] may be dependent on a value of the syntax element bit_depth_luma_minus8 in the SPS as bit_depth_luma_minus8 may be used to determine a bit depth of dra_global_offset and dra_delta_range[j].

A first example of the parsing dependency present in the PPS is shown in the syntax table below, where dependency on syntax elements from SPS is marked between the marks <MARK> and </MARK>.

| | Descriptor |
|---|---|
| pic_parameter_set_rbsp( ) { ... <MARK> if( sps_dra_flag ) { </MARK> pic_dra_enabled_present_flag if( pic_dra_enabled_present_flag ) { pic_dra_enabled_flag if( pic_dra_enabled_flag ) pic_dra_aps_id } } | u(1) u(1) u(3) |

A second example of a parsing dependency present in APS DRA is shown in syntax table and semantic of DRA APS:

| | Descriptor |
|---|---|
| dra_data( ) { ... | |
| dra_global_offset | <MARK> u(v) </MARK> |
| if( dra_equal_ranges_flag ) dra_delta_range[ 0 ] | <MARK> u(v)</MARK> |
| Else for( j = 0; j <= dra_number_ranges_minus1; j++ ) dra_delta_range[ j ] | <MARK> u(v) </MARK> | dra_global_offset specifies that the starting codeword position utilized to derive DRA table and initializes the variable InDraRange[0] as follows:

$$InDraRange[0]=dra\_global\_offset \quad (7\text{-}70)$$

dra_delta_range[j] specifies the size of the j-th range in codewords which is utilized to derive the DRA table. The value of dra_delta_range[j] shall be in the range of 1 to $(1<<BitDepth_Y)-1$, inclusive.

The variable InDraRange[j] for j in the range of 1 to dra_number_ranges_minus1+1, inclusive, are derived as follows:

$$InDraRange[j]=InDraRange[j-1]+(dra\_equal\_ranges\_flag==1)?dra\_delta\_range[0]:dra\_delta\_range[j-1] \quad (7\text{-}71)$$

It is a requirement of the bitstream conformance that InDraRange[j] shall be in the range 0 to $(1<<BitDepth_Y)-1$, inclusive.

The number of bits used to signal dra_global_offset and dra_delta_range[j] is <MARK> $BitDepth_Y$ </MARK> bits.

Where BitDepth$_Y$ variable is derived from SPS syntax element as follows:

bit_depth_luma_minus8 specifies the bit depth of the samples of the luma array BitDepth$_Y$ and the value of the luma quantization parameter range offset QpBdOffset$_Y$ as follows:

$$BitDepth_Y = 8 + bit\_depth\_luma\_minus8 \qquad (7\text{-}3)$$

In the latter case (of the APS), it is understandable that bit depth dependency is beneficial for DRA design being applicable for various bit depths, e.g., 12 or 16 bit data, however, as discussed above, having such a dependency may be undesirable.

A possible solution for such a problem is to introduce an additional syntax element which would identify the number of bits used to signal a global DRA offset (e.g., dra_global_offset) and a syntax element indicative of the bit depth of luma (e.g., bit_depth_luma_minus8). However, such a design may also be undesirable due to the fact the design would increase the bit rate and complexity of video encoder 200 and video decoder 300 by introducing the additional syntax element.

According to the techniques of this disclosure, to resolve the above problems, the following changes to the design in EVC are disclosed. In some examples, these techniques may be applicable to other video codec designs as well. For example, video encoder 200 and video decoder 300 may be configured to operate according to the following changes.

According to the techniques of this disclosure, the dependency of DRA syntax elements in a PPS and/or APS on the SPS may be removed. In this manner, video decoder 300 may parse an SPS applicable to a block of the video data, parse one or more dynamic range adjustment (DRA) syntax elements in a second parameter set applicable to the block, wherein the parsing of the one or more DRA syntax elements is not dependent on any syntax element of the SPS, and process the block based on the SPS and second parameter set. In some examples, the SPS and the second parameter set are in separate NAL units.

1) Removal of the Dependency in the PPS:

In some examples, the second parameter set is a PPS. The one or more DRA syntax elements of the second parameter set may include one or more of a first DRA syntax element (e.g., pic_dra_enabled_present_flag) indicative of whether a second DRA syntax element (which is itself indicative of whether DRA is enabled) is present in the PPS, the second DRA syntax element (e.g., pic_dra_enabled_flag), or a third DRA syntax element (e.g., pic_dra_aps_id) indicative of an identifier of a DRA adaptation parameter set. In some examples, video decoder 300 may parse the PPS prior to parsing a syntax element in the SPS indicative of whether DRA mapping on output samples of the block is used. By having DRA syntax elements in the PPS not be dependent on a syntax element in the SPS, video decoder 300 may parse the PPS even if video decoder 300 has not yet received or parsed the SPS.

To remove the SPS syntax element dependency in the PPS in EVC, the condition shown below between the marks <DELETE> and </DELETE> may be removed. Additionally, the number of control syntax elements may be reduced by removing pic_dra_enabled_present_flag shown below between the marks <DELETE> and </DELETE>. For example, video encoder 200 may not signal pic_dra_enabled_present_flag and video decoder 300 may not determine the condition deleted below.

| | |
|---|---|
| <DELETE> if( sps_dra_flag ) {   pic_dra_enabled_present_flag | <DELETE> u(1) </DELETE> |
|   if( pic_dra_enabled_present_flag ) { </DELETE>     pic_dra_enabled_flag     if( pic_dra_enabled_flag )       pic_dra_aps_id <DELETE> }</DELETE> } | u(1) u(5) |

2) Removal of the Parsing Dependency in the APS:

In some examples, the second parameter set is an adaptation parameter set. In some examples, the one or more DRA syntax elements comprise at least one of a syntax element whose value is indicative of a starting codeword position utilized to derive a DRA table or a syntax element whose value is indicative of a range in codewords which is utilized to derive a DRA table. In some examples, video decoder 300 may parse the second parameter set prior to parsing a syntax element in the SPS indicative of a luma bit depth. In some examples, a first DRA syntax element of the one or more DRA syntax elements is of a predetermined fixed bit depth (e.g., 10 bits). In some examples, the first DRA syntax element is a syntax element whose value is indicative of a starting codeword position utilized to derive a DRA table. In some examples, the first DRA syntax element is a syntax element whose value is indicative of a range in codewords which is utilized to derive a DRA table. By having DRA syntax elements in the DRA APS be of a fixed bit depth rather than having the DRA syntax elements' bit depth be based on a value of a syntax element in the SPS, video decoder 300 may parse the DRA APS even if video decoder 300 has not yet received or parsed the SPS.

To remove the parsing dependency in the DRA APS, the number of bits used for the signaling of syntax elements may be fixed, e.g., to use 10 bits, and video decoder 300 may determine the actual value of the syntax elements depending on the signaled bit depth, which is determined during the DRA reconstruction process. Since the syntax element interpretation process is conducted after parsing, no parsing dependency is introduced. For example, video encoder 200 may use a fixed number of bits to signal syntax elements, such as those marked below. Changes are marked below between the marks <CHANGE> and </CHANGE>.

dra_global_offset specifies that the starting codeword position utilized to derive the DRA table, namely to define the value of the variable InDraRange[0]. <CHANGE> The number of bits used to signal dra_global_offset is 10 bits. </CHANGE> dra_delta_range[j] specifies the size of the j-th range in codewords which is utilized to derive the DRA table, for j in the range of 1 to dra_number_ranges_minus1+1. <CHANGE> The number of bits used to signal dra_delta_range[j] is 10 bits. </CHANGE> The value of dra_delta_range[j] shall be in the range of 1 to Min(1023, (1<<BitDepth$_Y$)−1), inclusive.

The variable InDraRange[0] is initialized as follows:

$$<\text{CHANGE}>InDraRange[0]= dra\_global\_offset<<Max(0,BitDepth_Y-10)</CHANGE> \qquad (7\text{-}70)$$

The variable InDraRange[j] for j in the range of 1 to dra_number_ranges_minus1+1, inclusive, are derived as follows:

deltaRange=(dra_equal_ranges_flag==1)?dra_
    delta_range[0]:dra_delta_range[j−1]

InDraRange[j]=InDraRange[j−1]+<CHANGE>
    (deltaRange<<Max(0,BitDepth$_Y$−10))</
    CHANGE>    (7-71)

It is a requirement of the bitstream conformance that InDraRange[j] shall be in the range 0 to (1<<BitDepth$_Y$)−1, inclusive.

Figure 13:
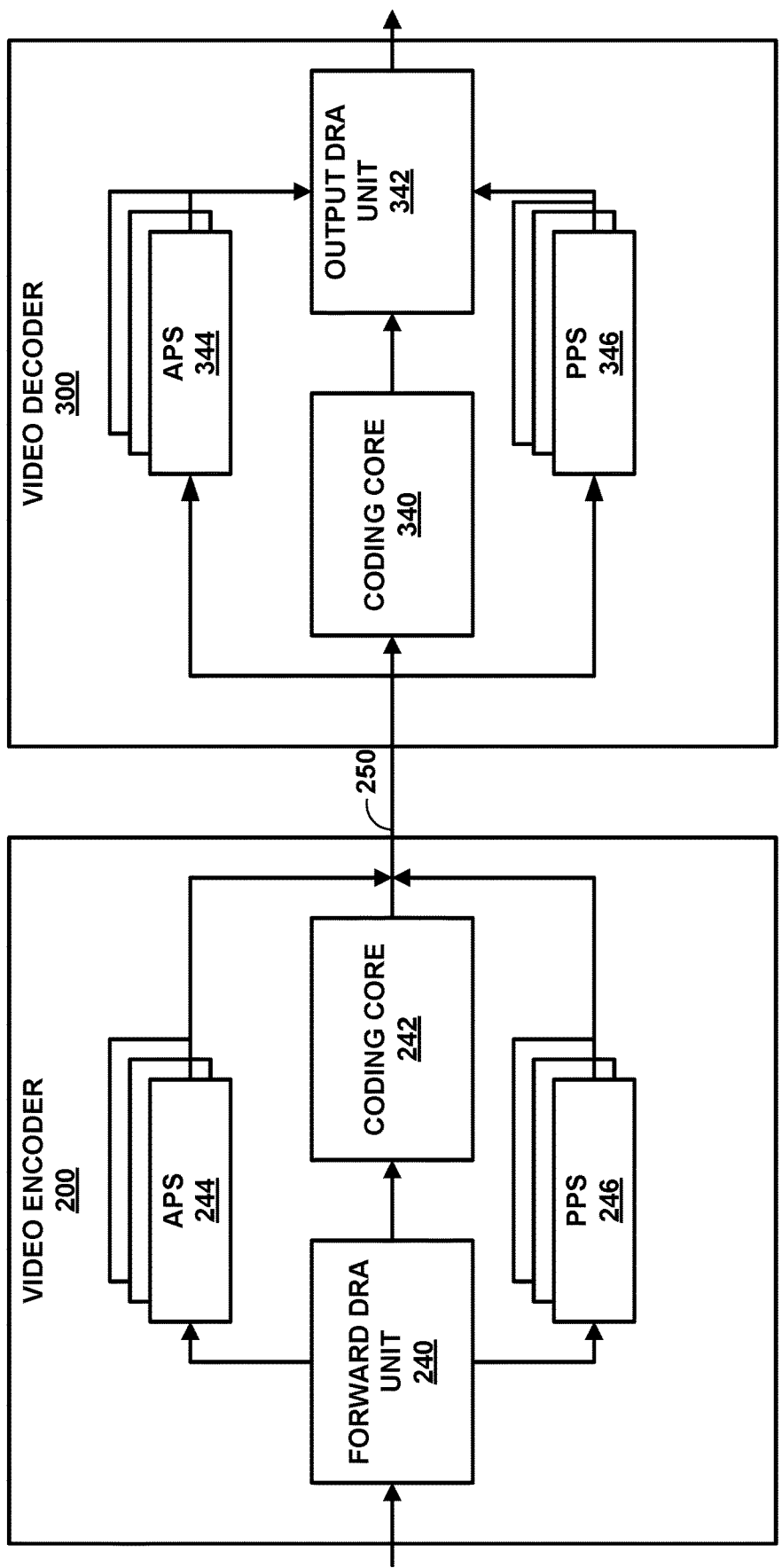
FIG. 13 is a block diagram of a video encoder and video decoder system including DRA units.

FIG. 13 is a block diagram of a video encoder and video decoder system including DRA units. A video encoder, such as video encoder 200, may include forward DRA unit 240 and coding core 242. In some examples, coding core 242 may include the units depicted in FIG. 2 and may function as described above with respect to FIG. 2. Video encoder 200 may also determine a plurality of APSs 244 and a plurality of PPSs 246 that may include information from forward DRA unit 240.

According to the techniques of this disclosure, video encoder 200 may signal an SPS applicable to a block of the video data. Forward DRA unit 240 may determine one or more DRA syntax elements in a second parameter set applicable to the block, wherein parsing of the one or more DRA syntax elements by a video decoder is not dependent on any syntax element of the SPS. Video encoder 200 may signal the second parameter set.

A video decoder, such as video decoder 300, may include coding core 340 and output DRA unit 342. In some examples, coding core 340 may include the units depicted in FIG. 3 and may function as described above with respect to FIG. 3. Video decoder 300 may also determine a plurality of APSs 344 and a plurality of PPSs 346 which may include information to be used by output DRA unit 342.

According to the techniques of this disclosure, video decoder 300 may parse a sequence parameter set (SPS) applicable to a block of the video data. Output DRA unit 342 may parse one or more dynamic range adjustment (DRA) syntax elements in a second parameter set applicable to the block, wherein the one or more parsing of the DRA syntax elements is not dependent on any syntax element of the SPS. Output DRA unit 342 may process the block based on the SPS and the second parameter set.

Figure 14:
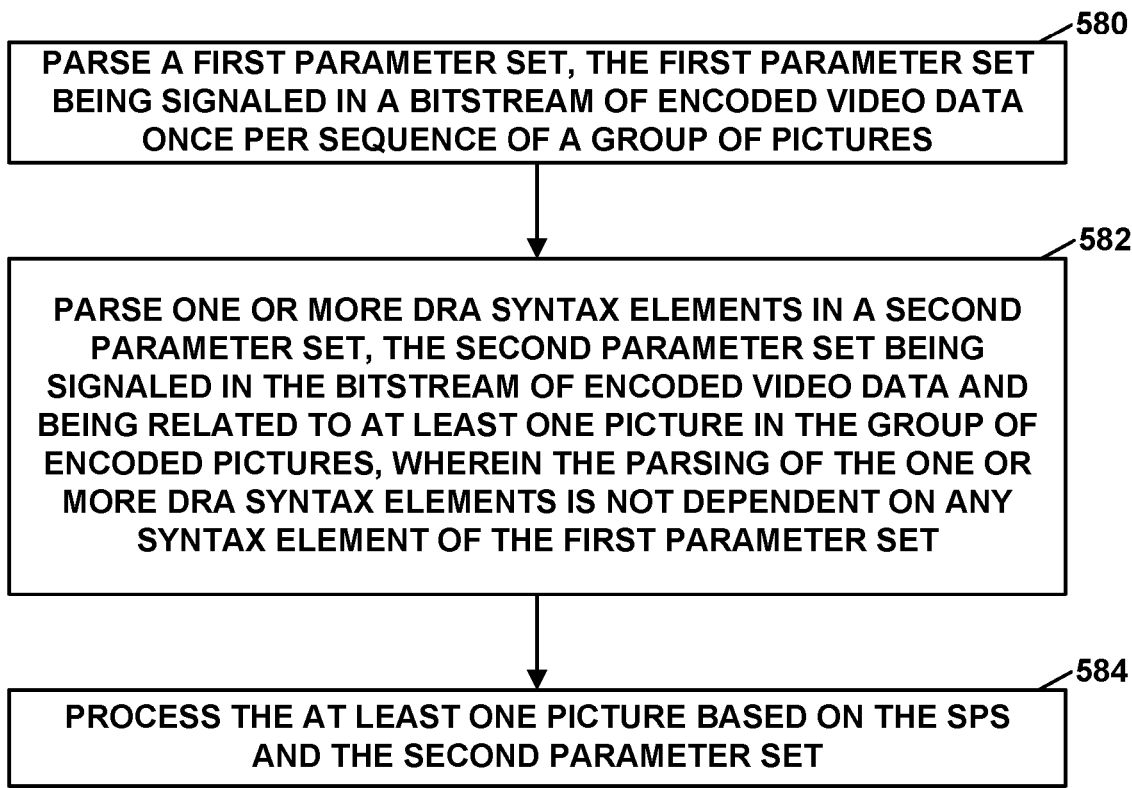
FIG. 14 is a flowchart illustrating dynamic range adjustment parameter parsing techniques according to this disclosure.

FIG. 14 is a flowchart illustrating dynamic range adjustment parameter parsing techniques according to this disclosure. Video decoder 300 may parse a first parameter set, the first parameter set being signaled in a bitstream of encoded video data once per sequence of a group of encoded pictures (580). For example, video decoder 300 may receive in a bitstream an SPS and may parse the SPS to determine values of syntax elements included within the SPS. The SPS may be applicable to the sequence of pictures in that the values of the syntax elements within the SPS may be used when decoding the sequence of pictures. In other words, the SPS may be applicable to a sequence of video data that includes a plurality of pictures.

Video decoder 300 may parse one or more dynamic range adjustment (DRA) syntax elements in a second parameter set, the second parameter set being signaled in the bitstream of encoded video data, the second parameter set being related to at least one of the pictures in the group of encoded pictures, wherein the parsing of the one or more DRA syntax elements is not dependent on any syntax element of the first parameter set (582). In this manner, the parsing of the second parameter set is independent of the applicable first parameter set. For example, video decoder 300 may parse the second parameter set independently from the first parameter set and may not depend on or rely on any syntax element within the first parameter set when parsing the second parameter set.

Video decoder 300 may process the at least one picture based on the first parameter set and second parameter set (584). For example, video decoder 300 may utilize values of syntax elements within the first parameter set and the second parameter set when processing the at least one picture.

In some examples, the first parameter set and the second parameter set are in separate network abstraction layer (NAL) units. In some examples, as part of independently parsing the second parameter set, video decoder 300 may parse the second parameter set prior to parsing the first parameter set. In some examples, the first parameter set is a sequence parameter set (SPS) and the second parameter set is a picture parameter set (PPS). In some examples, the one or more DRA syntax elements comprise one of more of i) a first DRA syntax element indicative of whether a second DRA syntax element is present in the PPS, ii) the second DRA syntax element, the second DRA syntax element being indicative of whether DRA is enabled, or iii) a third DRA syntax element indicative of an identifier of a third parameter set describing DRA parameters.

In some examples, as part of parsing the one or more DRA syntax elements, video decoder 300 may parse the PPS prior to parsing a syntax element in the SPS indicative of whether dynamic range adjustment mapping on output samples of the block is used. For example, video decoder 300 may parse the PPS prior to parsing sps_dra_flag.

In some examples, the first parameter set is a sequence parameter set (SPS) and the second parameter set is an adaptation parameter set (APS). In some examples, the one or more DRA syntax elements comprise at least one of a first syntax element whose value is indicative of a starting codeword position utilized to derive a DRA table or a second syntax element whose value is indicative of a range in codewords which is utilized to derive the DRA table. In some examples, as part of parsing the one or more DRA syntax elements, video decoder 300 may parse the APS prior to parsing a syntax element in the SPS indicative of a luma bit depth. In some examples, a DRA syntax element in the APS is of a predetermined fixed bit depth. In some examples, the DRA syntax element comprises a syntax element whose value indicative of a starting codeword position utilized to derive a DRA table. For example, the DRA syntax element may include dra_global_offset. In some examples, the DRA syntax element comprises a syntax element whose value is indicative of a range in codewords which is utilized to derive a DRA table. For example, the DRA syntax element may include dra_delta_range[j]. In some examples, the predetermined fixed bit depth is 10 bits.

Figure 15:
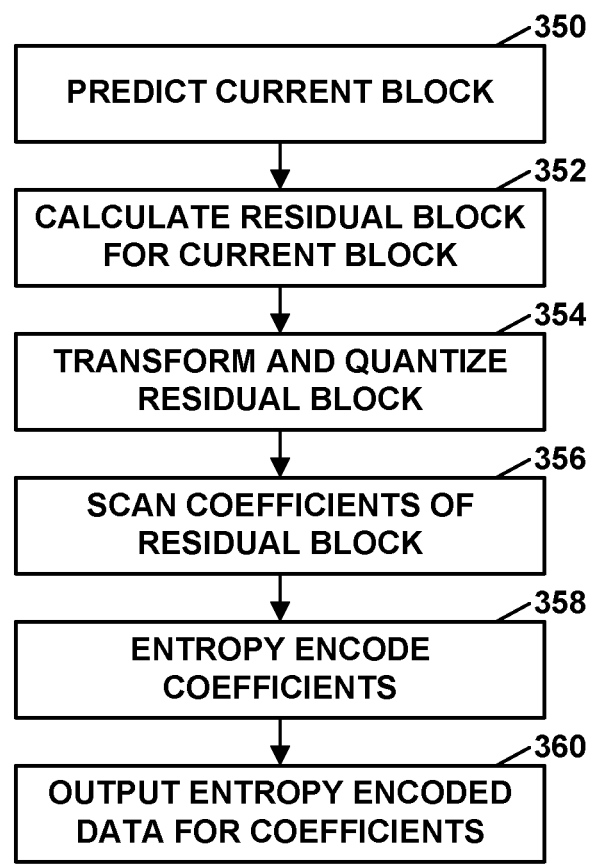
FIG. 15 is a flowchart illustrating an example of video encoding.

FIG. 15 is a flowchart illustrating an example method for encoding a current block. The current block may comprise a current CU. Although described with respect to video encoder 200 (FIGS. 1 and 2), it should be understood that other devices may be configured to perform a method similar to that of FIG. 15.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 16:
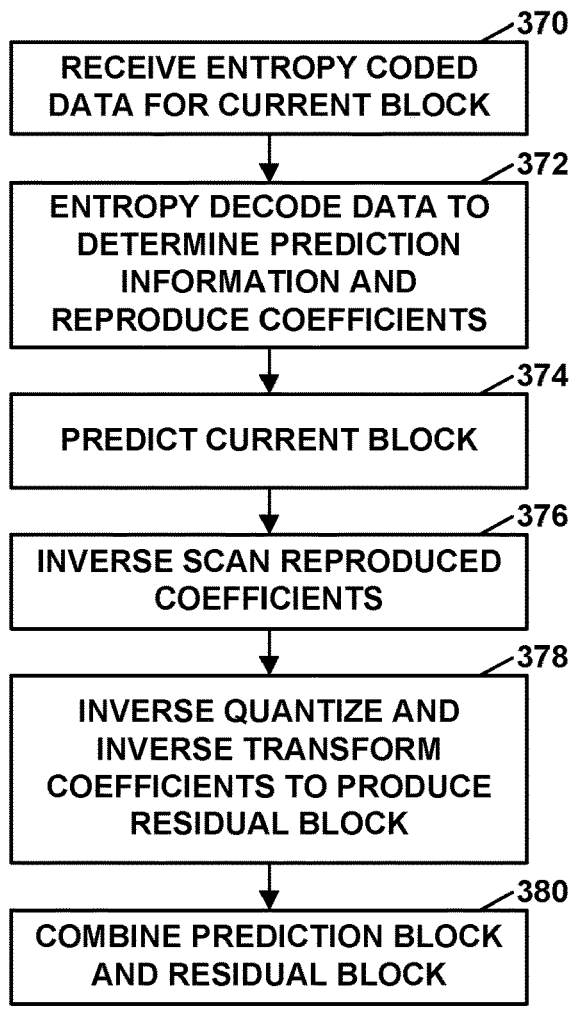
FIG. 16 is a flowchart illustrating an example of video decoding.

FIG. 16 is a flowchart illustrating an example method for decoding a current block of video data. The current block may comprise a current CU. Although described with respect to video decoder 300 (FIGS. 1 and 3), it should be understood that other devices may be configured to perform a method similar to that of FIG. 16.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

By removing the dependency of a second parameter set (e.g., a PPS or an APS) on a syntax element(s) of an SPS, the techniques of this disclosure facilitate video decoder 300 parsing the second parameter set without having to wait to receive the SPS in a bitstream. As such, the techniques of this disclosure may reduce decoding latency.

This disclosure contains the following clauses.

Clause 1A. A method of processing video data, the method comprising: refraining from determining pic_dra_enabled_present_flag in a picture parameter set; and processing the video data based on the picture parameter set.

Clause 2A. A method of processing video data, the method comprising: fixing a number of bits for a syntax element in a dynamic range adjustment adaptation parameter set to a predetermined number of bits; signaling the syntax element with the predetermined number of bits; and processing the video data based on the syntax element.

Clause 3A. The method of clause 2A, wherein the syntax element is dra_global_offset or dra_delta_range[j].

Clause 4A. The method of clause 2A or clause 3A, wherein the predetermined number of bits is 10.

Clause 5A. The method of clause 1A, wherein processing comprises decoding.

Clause 6A. The method of any of clauses 1A-5A, wherein processing comprises encoding.

Clause 7A. A device for processing video data, the device comprising one or more means for performing the method of any of clauses 1A-6A.

Clause 8A. The device of clause 7A, wherein the one or more means comprise one or more processors implemented in circuitry.

Clause 9A. The device of any of clauses 7A and 8A, further comprising a memory to store the video data.

Clause 10A. The device of any of clauses 7A-9A, further comprising a display configured to display decoded video data.

Clause 11A. The device of any of clauses 7A-10A, wherein the device comprises one or more of a camera, a computer, a mobile device, a broadcast receiver device, or a set-top box.

Clause 12A. The device of any of clauses 7A-11A, wherein the device comprises a video decoder.

Clause 13A. The device of any of clauses 7A-12A, wherein the device comprises a video encoder.

Clause 14A. A computer-readable storage medium having stored thereon instructions that, when executed, cause one or more processors to perform the method of any of clauses 1A-6A.

Clause 15A. A device for encoding video data, the device comprising: means for refraining from determining pic_dra_enabled_present_flag in a picture parameter set; and means for processing the video data based on the picture parameter set.

Clause 16A. A device for encoding video data, the device comprising: means for fixing a number of bits for a syntax element in a dynamic range adjustment adaptation parameter set to a predetermined number of bits; means for signaling the syntax element with the predetermined number of bits; and means for processing the video data based on the syntax element.

Clause 1B. A method of processing video data, the method comprising: parsing a first parameter set, the first parameter set being signaled in a bitstream of encoded video data once per sequence of a group of encoded pictures; parsing one or more dynamic range adjustment (DRA) syntax elements in a second parameter set, the second parameter set being signaled in the bitstream of encoded video data and being related to at least one picture in the group of encoded pictures, wherein the parsing of the one or more DRA syntax elements is not dependent on any syntax element of the first parameter set; and processing the at least one picture based on the first parameter set and the second parameter set.

Clause 2B. The method of clause 1B, wherein the first parameter set and the second parameter set are in separate network abstraction layer units.

Clause 3B. The method of clause 1B or 2B, wherein parsing the one or more DRA syntax elements comprises parsing the second parameter set prior to parsing the first parameter set.

Clause 4B. The method of any combination of clauses 1B-3B, wherein the first parameter set is a sequence parameter set (SPS) and second parameter set is a picture parameter set (PPS).

Clause 5B. The method of clause 4B, wherein the one or more DRA syntax elements comprise one of more of i) a first DRA syntax element indicative of whether a second DRA syntax element is present in the PPS, ii) the second DRA syntax element, the second DRA syntax element being indicative of whether DRA is enabled, or iii) a third DRA syntax element indicative of an identifier of a third parameter set describing DRA parameters.

Clause 6B. The method of clause 4B, wherein parsing the one or more DRA syntax elements comprises parsing the PPS prior to parsing a syntax element in the SPS indicative of whether DRA mapping on output samples of the at least one picture is used.

Clause 7B. The method of any combination of clauses 1B-3B, wherein the first parameter set is a sequence parameter set (SPS) and the second parameter set is an adaptation parameter set (APS).

Clause 8B. The method of clause 7B, wherein the one or more DRA syntax elements comprise at least one of a first syntax element whose value is indicative of a starting codeword position utilized to derive a DRA table or a second syntax element whose value is indicative of a range in codewords which is utilized to derive the DRA table.

Clause 9B. The method of clause 7B or clause 8B, wherein parsing the one or more DRA syntax elements comprises parsing the APS prior to parsing a syntax element in the SPS indicative of a luma bit depth.

Clause 10B. The method of any combination of clauses 7B-9B, wherein a first DRA syntax element of one or more DRA syntax elements is of a predetermined fixed bit depth.

Clause 11B. The method of clause 10B, wherein the first DRA syntax element comprises a syntax element whose value is indicative of a starting codeword position utilized to derive a DRA table.

Clause 12B. The method of clause 10B, wherein the first DRA syntax element comprises a syntax element whose value is indicative of a range in codewords which is utilized to derive a DRA table.

Clause 13B. The method of any combination of clauses 10B-12B, wherein the predetermined fixed bit depth is 10 bits.

Clause 14B. A device for processing video data, the device comprising: memory configured to store the video data; and one or more processors implemented in circuitry and coupled to the memory, the one or more processors being configured to: parse a first parameter set, the first parameter set being signaled in a bitstream of encoded video data once per sequence of a group of encoded pictures; parse one or more dynamic range adjustment (DRA) syntax elements in a second parameter set, the second parameter set being signaled in the bitstream of encoded video data and being related to at least one picture in the group of encoded pictures, wherein the parsing of the one or more DRA syntax elements is not dependent on any syntax element of the first parameter set; and process the at least one picture based on the first parameter set and the second parameter set.

Clause 15B. The device of clause 14B, wherein the first parameter set and the second parameter set are in separate network abstraction layer units.

Clause 16B. The device of clause 14B or clause 15B, wherein as part of parsing the one or more DRA syntax elements, the one or more processors are configured to: parse the second parameter set prior to parsing the first parameter set.

Clause 17B. The device of any combination of clauses 14B-16B, wherein the first parameter set is a sequence parameter set (SPS) and the second parameter set is a picture parameter set (PPS).

Clause 18B. The device of clause 17B, wherein the one or more DRA syntax elements comprise one of more of i) a first DRA syntax element indicative of whether a second DRA syntax element is present in the PPS, ii) the second DRA syntax element, the second DRA syntax element being indicative of whether DRA is enabled, or iii) a third DRA syntax element indicative of an identifier of a third parameter set describing DRA parameters.

Clause 19B. The device of clause 17B, wherein as part of parsing the one or more DRA syntax elements, the one or more processors are configured to: parse the PPS prior to parsing a syntax element in the SPS indicative of whether dynamic range adjustment mapping on output samples of the at least one picture is used.

Clause 20B. The device of any combination of clauses 14B-16B, wherein the first parameter set is a sequence parameter set (SPS) and the second parameter set is an adaptation parameter set (APS).

Clause 21B. The device of clause 20B, wherein the one or more DRA syntax elements comprise at least one of a first syntax element whose value is indicative of a starting codeword position utilized to derive a DRA table or a second syntax element whose value is indicative of a range in codewords which is utilized to derive the DRA table.

Clause 22B. The device of clause 20B or clause 21B, wherein as part of parsing the one or more DRA syntax elements, the one or more processors are configured to: parse the APS prior to parsing a syntax element in the SPS indicative of a luma bit depth.

Clause 23B. The device of any combination of clauses 20B-22B, wherein a first DRA syntax element of the one or more DRA syntax elements is of a predetermined fixed bit depth.

Clause 24B. The device of clause 23B, wherein the first DRA syntax element comprises a syntax element whose value is indicative of a starting codeword position utilized to derive a DRA table.

Clause 25B. The device of clause 23B, wherein the first DRA syntax element comprises a syntax element whose value is indicative of a range in codewords which is utilized to derive a DRA table.

Clause 26B. The device of any combination of clauses 23B-25B, wherein the predetermined fixed bit depth is 10 bits.

Clause 27B. A non-transitory computer-readable medium storing instructions, which, when executed, cause one or more processors to: parse a first parameter set, the first parameter set being signaled in a bitstream of encoded video data once per sequence of a group of encoded pictures; parse one or more dynamic range adjustment (DRA) syntax elements in a second parameter set, the second parameter set being signaled in the bitstream of encoded video data and being related to at least one picture in the group of encoded pictures, wherein the parsing of the one or more DRA syntax elements is not dependent on any syntax element of the first parameter set; and process the at least one picture based on the first parameter set and the second parameter set.

Clause 28B. A device for processing video data, the device comprising: means for parsing a first parameter set, the first parameter set being signaled in a bitstream of encoded video data once per sequence of a group of encoded pictures; means for parsing one or more dynamic range adjustment (DRA) syntax elements in a second parameter set, the second parameter set being signaled in the bitstream of encoded video data and being related to at least one picture in the group of encoded pictures, wherein the parsing of the one or more DRA syntax elements is not dependent on any syntax element of the first parameter set; and means for processing the at least one picture based on the first parameter set and the second parameter set.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
    parsing a sequence parameter set (SPS), the SPS being signaled in a bitstream of encoded video data once per sequence of a group of encoded pictures;
    parsing one or more dynamic range adjustment (DRA) syntax elements in a picture parameter set (PPS), the (PPS) being signaled in the bitstream of encoded video data and being related to at least one picture in the group of encoded pictures, wherein the parsing of the one or more DRA syntax elements in the PPS is not dependent on any syntax element of the SPS;
    parsing one or more DRA syntax elements in an adaptation parameter set (APS), the APS being signaled in the bitstream of encoded video data and being related to at least one picture in the group of encoded pictures, wherein the parsing of the one or more DRA syntax elements in the APS is not dependent on any syntax element of the SPS; and
    processing the at least one picture based on the SPS, the PPS and the APS.

2. The method of claim 1, wherein the SPS and the PPS are in separate network abstraction layer units.

3. The method of claim 1, wherein parsing the one or more DRA syntax elements in the PPS comprises parsing the PPS prior to parsing the SPS.

4. The method of claim 1, wherein the one or more DRA syntax elements comprise one or more of i) a first DRA syntax element indicative of whether DRA is enabled or, ii) a second DRA syntax element indicative of an identifier of the APS.

5. The method of claim 1, wherein parsing the one or more DRA syntax elements in the PPS comprises parsing the PPS prior to parsing a syntax element in the SPS indicative of whether DRA mapping on output samples of the at least one picture is used.

6. The method of claim 1, wherein the one or more DRA syntax elements in the APS comprise at least one of a first syntax element whose value is indicative of a starting codeword position utilized to derive a DRA table or a second syntax element whose value is indicative of a range in codewords which is utilized to derive the DRA table.

7. The method of claim 1, wherein parsing the one or more DRA syntax elements in the APS comprises parsing the APS prior to parsing a syntax element in the SPS indicative of a luma bit depth.

8. The method of claim 1, wherein a first DRA syntax element of one or more DRA syntax elements in the APS is of a predetermined fixed bit depth.

9. The method of claim 8, wherein the first DRA syntax element comprises a syntax element whose value is indicative of a starting codeword position utilized to derive a DRA table.

10. The method of claim 8, wherein the first DRA syntax element comprises a syntax element whose value is indicative of a range in codewords which is utilized to derive a DRA table.

11. The method of claim 8, wherein the predetermined fixed bit depth is 10 bits.

12. A device for processing video data, the device comprising:
    memory configured to store the video data; and
    one or more processors implemented in circuitry and coupled to the memory, the one or more processors being configured to:

parse a sequence parameter set (SPS), the SPS being signaled in a bitstream of encoded video data once per sequence of a group of encoded pictures;

parse one or more dynamic range adjustment (DRA) syntax elements in a picture parameter set (PPS), the PPS being signaled in the bitstream of encoded video data and being related to at least one picture in the group of encoded pictures, wherein the parsing of the one or more DRA syntax elements in the PPS is not dependent on any syntax element of the SPS;

parse one or more DRA syntax elements in an adaptation parameter set (APS), the APS being signaled in the bitstream of encoded video data and being related to at least one picture in the group of encoded pictures, wherein the parsing of the one or more DRA syntax elements in the APS is not dependent on any syntax element of the SPS; and process the at least one picture based on the SPS, the PPS, and the APS.

13. The device of claim 12, wherein the SPS and the PPS are in separate network abstraction layer units.

14. The device of claim 12, wherein as part of parsing the one or more DRA syntax elements in the PPS, the one or more processors are configured to:
parse the PPS prior to parsing the SPS.

15. The device of claim 12, wherein the one or more DRA syntax elements comprise one or more of i) a first DRA syntax element indicative of whether DRA is enabled, or iii) a second DRA syntax element indicative of an identifier of the APS.

16. The device of claim 12, wherein as part of parsing the one or more DRA syntax elements in the PPS, the one or more processors are configured to:
parse the PPS prior to parsing a syntax element in the SPS indicative of whether DRA mapping on output samples of the block is used.

17. The device of claim 12, wherein the one or more DRA syntax elements in the APS comprise at least one of a first syntax element whose value is indicative of a starting codeword position utilized to derive a DRA table or a second syntax element whose value is indicative of a range in codewords which is utilized to derive the DRA table.

18. The device of claim 12, wherein as part of parsing the one or more DRA syntax elements in the APS, the one or more processors are configured to:
parse the APS prior to parsing a syntax element in the SPS indicative of a luma bit depth.

19. The device of claim 12, wherein a first DRA syntax element of the one or more DRA syntax elements in the APS is of a predetermined fixed bit depth.

20. The device of claim 19, wherein the first DRA syntax element comprises a syntax element whose value is indicative of a starting codeword position utilized to derive a DRA table.

21. The device of claim 19, wherein the first DRA syntax element comprises a syntax element whose value is indicative of a range in codewords which is utilized to derive a DRA table.

22. The device of claim 19, wherein the predetermined fixed bit depth is 10 bits.

23. A non-transitory computer-readable medium storing instructions, which, when executed, cause one or more processors to:
parse a sequence parameter set (SPS), the SPS being signaled in a bitstream of encoded video data once per sequence of a group of encoded pictures;

parse one or more dynamic range adjustment (DRA) syntax elements in a picture parameter set, the PPS being signaled in the bitstream of encoded video data and being related to at least one picture in the group of encoded pictures, wherein the parsing of the one or more DRA syntax elements in the PPS is not dependent on any syntax element of the SPS;

parse one or more DRA syntax elements in an adaptation parameter set (APS), the APS being signaled in the bitstream of encoded video data and being related to at least one picture in the group of encoded pictures, wherein the parsing of the one or more DRA syntax elements in the APS is not dependent on any syntax element of the SPS; and process the at least one picture based on the SPS, the PPS, and the APS.

* * * * *